US012573902B2

(12) United States Patent (10) Patent No.: US 12,573,902 B2
Kuroda (45) Date of Patent: Mar. 10, 2026

(54) MOTOR WITH COMMUTATOR AND BRUSHES WITH CONTACT PORTIONS

(71) Applicant: MINEBEA MITSUMI Inc., Nagano (JP)

(72) Inventor: Minoru Kuroda, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 528 days.

(21) Appl. No.: 17/808,763

(22) Filed: Jun. 24, 2022

(65) Prior Publication Data

US 2023/0010839 A1 Jan. 12, 2023

(30) Foreign Application Priority Data

Jul. 7, 2021 (JP) ................................. 2021-112769
Feb. 10, 2022 (JP) ................................. 2022-019786

(51) Int. Cl.
*H02K 3/12* (2006.01)
*H02K 3/28* (2006.01)

(52) U.S. Cl.
CPC ................. *H02K 3/12* (2013.01); *H02K 3/28* (2013.01); *H02K 2213/03* (2013.01)

(58) Field of Classification Search
CPC .......... H02K 23/38; H02K 23/26; H02K 1/17; H02K 1/24; H02K 1/26; H02K 3/18; H02K 3/28; H02K 7/08; H02K 7/10; H02K 7/1166; H02K 2213/03; H02K 13/006; H02K 3/12
USPC ...... 310/54, 49.52, 128, 137, 180–208, 151, 310/148, 149, 225, 135, 136, 144
See application file for complete search history.

(56) References Cited

U.S. PATENT DOCUMENTS

| | | | | |
|---|---|---|---|---|
| 2,509,746 A | * | 5/1950 | Thomas ................. | H02K 23/26 310/225 |
| 4,243,902 A | * | 1/1981 | Ban ........................ | H02K 23/26 310/268 |
| 4,315,177 A | * | 2/1982 | Ban ........................ | H02K 23/26 310/198 |

(Continued)

FOREIGN PATENT DOCUMENTS

| | | | | |
|---|---|---|---|---|
| JP | 2011-041389 A | 2/2011 | | |
| JP | 4886469 B2 | * | 2/2012 | ............. H02K 23/26 |

OTHER PUBLICATIONS

JP-4886469-B2 English Translation.*

*Primary Examiner* — Maged M Almawri
(74) *Attorney, Agent, or Firm* — Chrisman Gallo Tochtrop LLC

(57) ABSTRACT

A motor including: a magnet; a plurality of slots opposing the magnet; coils, the coil extending over and being wound around two slots of the plurality of slots; a commutator including a plurality of segments; and a plurality of brushes including contact portions in contact with the plurality of segments in a circumferential direction, wherein a winding direction of the coil around one slot of the two slots wound around with the coil with the coil extending over the two slots is opposite to a winding direction of the coil around the other slot, and, in the circumferential direction, the coil wound around the one slot is connected to one segment of two adjacent segments of the plurality of segments, and the coil wound around the other slot is connected to the other segment of the two adjacent segments.

11 Claims, 18 Drawing Sheets

(56) References Cited

U.S. PATENT DOCUMENTS

| | | | | | |
|---|---|---|---|---|---|
| 4,447,751 | A | * | 5/1984 | Ban | H02K 29/08 |
| | | | | | 310/268 |
| 4,583,016 | A | * | 4/1986 | Ban | H02K 23/26 |
| | | | | | 310/46 |
| 4,847,526 | A | * | 7/1989 | Takehara | H02K 23/40 |
| | | | | | 310/154.25 |
| 4,933,586 | A | * | 6/1990 | Gotou | H02K 23/32 |
| | | | | | 310/198 |
| 5,044,065 | A | * | 9/1991 | Dyke | H02K 15/09 |
| | | | | | 29/598 |
| 5,191,257 | A | * | 3/1993 | Sugiyama | H02K 23/32 |
| | | | | | 310/198 |
| 5,994,812 | A | * | 11/1999 | Muszynski | H02K 3/28 |
| | | | | | 310/179 |
| 7,423,405 | B2 | * | 9/2008 | Okai | H02K 17/16 |
| | | | | | 310/154.03 |
| 7,619,344 | B2 | * | 11/2009 | Osawa | H02K 23/28 |
| | | | | | 310/198 |
| 9,496,771 | B2 | * | 11/2016 | Kawashima | H02K 5/148 |
| 10,886,800 | B2 | * | 1/2021 | Kang | H02K 15/067 |
| 2004/0145268 | A1 | * | 7/2004 | Yamamoto | H02K 23/30 |
| | | | | | 310/249 |
| 2012/0086297 | A1 | * | 4/2012 | Makino | H02K 23/38 |
| | | | | | 310/203 |
| 2013/0249339 | A1 | * | 9/2013 | Makino | H02K 23/38 |
| | | | | | 310/154.01 |
| 2014/0009027 | A1 | * | 1/2014 | Kawai | H02K 3/00 |
| | | | | | 310/198 |
| 2014/0042864 | A1 | * | 2/2014 | Ichikawa | H02K 3/28 |
| | | | | | 310/206 |
| 2015/0061448 | A1 | * | 3/2015 | Kimura | H02K 5/148 |
| | | | | | 310/177 |
| 2021/0057965 | A1 | * | 2/2021 | Hermann | H02K 11/02 |
| 2021/0320579 | A1 | * | 10/2021 | Sakata | H02K 7/003 |

* cited by examiner

MOTOR WITH COMMUTATOR AND BRUSHES WITH CONTACT PORTIONS

CROSS-REFERENCE TO RELATED APPLICATIONS

This application claims the benefit of priority to Japanese Application No. JP2021-112769 filed on Jul. 7, 2021 and Japanese Application No. JP 2022-019786 filed on Feb. 10, 2022, the entire disclosure of which are hereby incorporated herein by reference.

TECHNICAL FIELD

The present invention relates to a motor.

BACKGROUND ART

In a direct current motor (i.e., a so-called "brush motor") using a commutator including a plurality of segments, and a brush, a cycle of a torque ripple may be shortened with an increased number of magnetic poles, and noise having a high frequency may be generated due to the torque ripple.

In a case of a brush motor being produced from a simple coil of concentrated winding wiring without increasing magnetic poles, when contact of a brush shifts from a contacting segment to a different segment, a spark may be generated between the different segment and the brush. When generation of such a spark becomes active, there is a concern that wear of the brush may be accelerated, and life of the brush may be affected.

In a case of the coil of concentrated winding wiring, a potential difference may increase between adjacent segments, and a spark is likely to be generated between the segment and the brush due to the potential difference.

CITATION LIST

Patent Literature

Patent Document 1: JP 2011-41389 A

SUMMARY OF INVENTION

Technical Problem

Therefore, the present invention has been made in view of the above situation, and an object of the present invention is to provide a motor being a brush motor, the motor being less likely to generate a spark between a segment and a brush.

Solution to Problem

The object described above is achieved by the present invention below.

In other words, an aspect of a motor according to the present invention includes:
a magnet;
a plurality of slots opposing the magnet;
coils, each of the coils extending over and being wound around two slots of the plurality of slots;
a commutator including a plurality of segments; and
a plurality of brushes, each of the plurality of brushes including a contact portion in contact with one or more of the plurality of segments in a circumferential direction, wherein a winding direction of the coil around one slot of the two slots wound around with the coil with the coil extending over the two slots is opposite to a winding direction of the coil around the other slot, and, in the circumferential direction, the coil wound around the one slot is connected to one segment of two adjacent segments of the plurality of segments, and the coil wound around the other slot is connected to the other segment of the two adjacent segments.

DESCRIPTION OF EMBODIMENTS

First to fifth embodiments being exemplary aspects of the present invention will be described below with reference to the drawings.

First Embodiment

Figure 1:
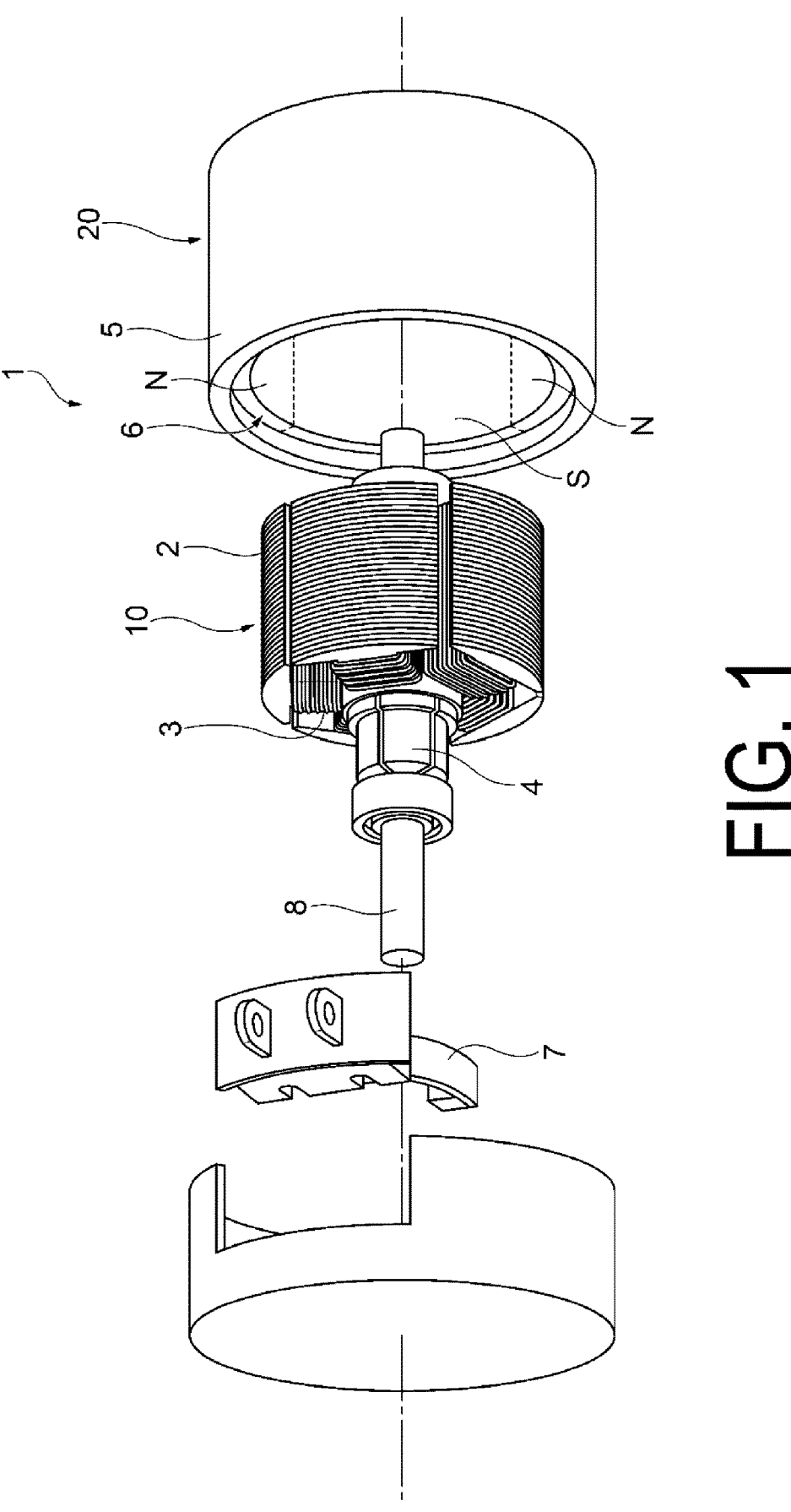
FIG. 1 is an exploded perspective view of a motor according to an embodiment being an example of the present invention.
Figure 2:
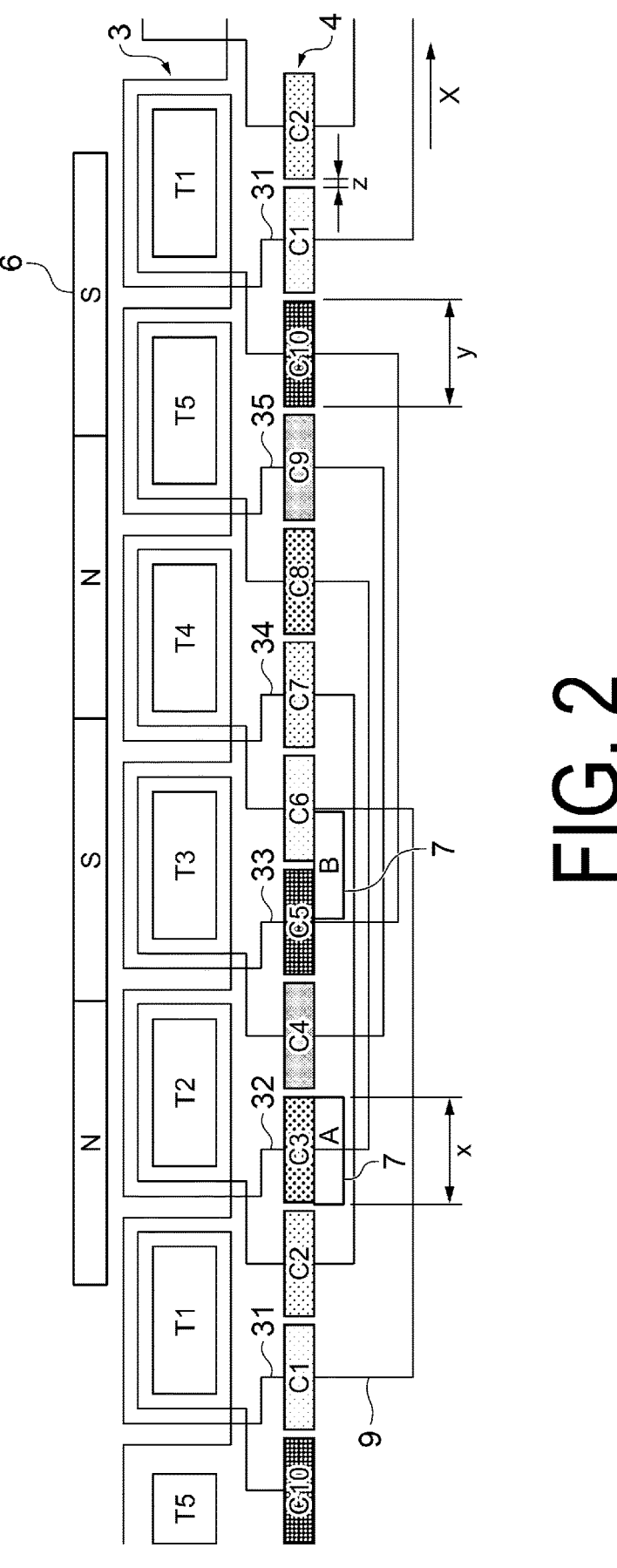
FIG. 2 is a schematic view developing, in a left-right direction, components of an armature arranged in a circumferential direction in a motor according to a first embodiment being an example of the present invention, and illustrating a mutual relationship (a positional relationship and a connection relationship).

FIG. 1 is an exploded perspective view of a motor 1 according to the first embodiment being an example of the present invention. FIG. 2 is a schematic view developing, in a left-right direction, components of an armature arranged in a circumferential direction in the motor 1, and illustrating a mutual relationship (a positional relationship and a connection relationship). Hereinafter, description is given with a left side (an opposite side to an arrow X direction) in FIG. 2 as one side, and a right side (an arrow X direction side) as the other side in the circumferential direction. The same applies to schematic views (FIGS. 4 and 5 described below in addition to FIG. 2 in the present embodiment) developing the components of the armature in the left-right direction, including other embodiments.

As illustrated in FIG. 1, the motor 1 according to the present embodiment is a four-pole five-slot motor including an armature 10 at a rotating side fixed to and rotating with a shaft 8, and a stator 20 at a stator side. In the motor 1, the armature 10 includes a rotor core 2 including a plurality of (five in the present embodiment) slots (magnetic pole portions), a coil 3 wound around each of the slots, and a commutator 4 including a plurality of (ten in the present embodiment) segments. Meanwhile, the stator 20 includes a housing 5, a magnet 6 including a plurality of (four in the present embodiment) magnetic poles, and a plurality of brushes 7 in contact with the segments of the commutator 4.

Further, in FIG. 2 and subsequent schematic views and explanatory views (including other embodiments, and the like), lower solid lines indicate connection wiring lines (also referred to as "connecting wires") 9 between the segments. Further, in the solid line, a place with a black spot overlapping an intersection point of a cross or a T-intersection represents a connection state, and a mere place of an intersection point of a cross without a black spot represents a non-connection state.

As illustrated in FIG. 2, the rotor core 2 includes a first tooth T1 to a fifth tooth T5 as the plurality of (five in the present embodiment) slots arranged in the circumferential direction. Coils 31 to 35 are wound around the first tooth T1 to the fifth tooth T5, respectively. A winding direction (direction of a helix) and the like of each of the coils 31 to 35 will be described below.

The commutator 4 includes a segment C1 to a segment C10 as the plurality of segments arranged in the circumferential direction. The segment C1 to the segment C10 are configured to come into contact with contact portions A and B of the plurality of brushes 7 to be energized. The housing 5 houses the amateur 10, and also functions as a yoke by being formed of a magnetic body (for example, a ferromagnetic material) such as iron.

The magnet 6 has a cylindrical shape provided at an inner surface of the housing 5, and is a permanent magnet having four magnetic poles. Two different magnetic poles (N pole and S pole) are alternately magnetized in the circumferential direction in the present embodiment. In FIG. 1, in the magnet 6, a boundary between the two different magnetized magnetic poles is indicated by a dotted line.

The first tooth T1 to the fifth tooth T5 as the slots oppose an inner circumferential surface of the magnet 6.

Figure 3:
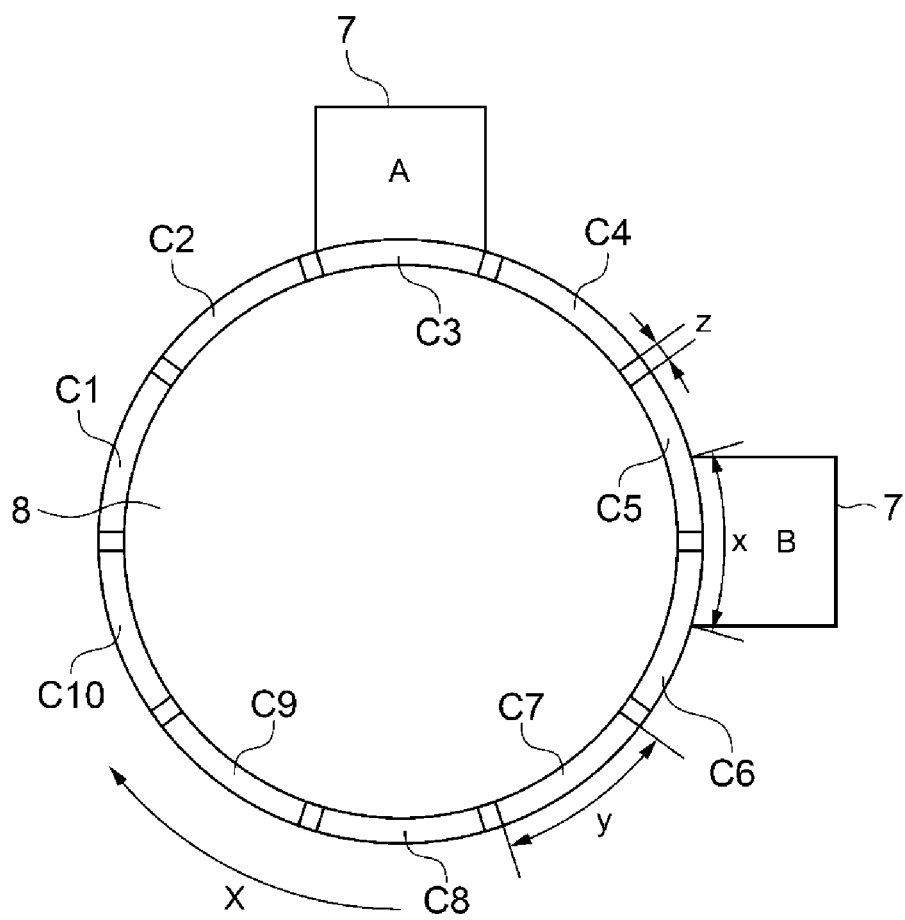
FIG. 3 is a schematic cross-sectional view of a portion of contact between a commutator and a plurality of brushes in a plane perpendicular to an axial direction of a shaft in FIG. 1.

FIG. 3 illustrates a schematic cross-sectional view of a portion of contact between the commutator 4 and the plurality of brushes 7 in a plane perpendicular to an axial direction of the shaft 8. The plurality of brushes 7 include the contact portions A and B in contact with two adjacent segments in the circumferential direction among the plurality of segments (C1 to C10). The contact portion A and the contact portion B are disposed at positions having a predetermined angle (for example, 90°) as a central angle θ about an axis of the shaft 8, and are in contact with the commutator 4. The shaft 8 and the commutator 4 are configured to rotate in the arrow X direction.

As illustrated in FIGS. 2 and 3, when a width of each of the contact portions A and B of the plurality of brushes 7 in contact with the commutator 4 in the circumferential direction (arrow X direction) of the commutator 4 is x, a width of each of the segments (C1 to C10) in the commutator 4 is y, and a gap between two adjacent segments is z, a relational expression (1) below is satisfied in the present embodiment.

$$x < y + 2z \qquad \text{Relational expression (1)}$$

By satisfying the relational expression (1) described above, the contact portions A and B of the plurality of brushes 7 are not in contact with three or more segments at the same time, as illustrated in FIG. 3, and thus a short circuit can be suppressed.

In the present embodiment, each of the coils 3 extends over and is wound around two slots of the first tooth T1 to the fifth tooth T5 as the plurality of slots.

Further, for each of the coils 3, a winding direction of the coil 3 around one slot (tooth) of two slots (teeth) wound around with the coil 3 with the coil 3 extending over the two slots is opposite to a winding direction of the coil 3 around the other slot (tooth).

Furthermore, for each of the coils 3, in the circumferential direction, the coil 3 wound around one slot (tooth) is connected to one segment of two adjacent segments, and the coil 3 wound around the other slot (tooth) is connected to the other segment of the two adjacent segments.

A winding direction of the coil 3 and connection to the segment will be described below in detail by using, as a representative, the coil 32 wound around the second tooth T2 and the third tooth T3 being two adjacent slots.

Note that, in the present embodiment, when a winding direction of the coil 3 and a direction of a flow of a current are indicated, "clockwise" or "counterclockwise" is used as a rotational direction in the drawing for convenience's sake, but this merely indicates a rotational direction in the drawing and does not specify an actual winding direction of a coil or an actual direction of a flow of a current. However, in an actual winding direction of a coil and an actual direction of a flow of a current, "clockwise" and "counterclockwise" are reverse rotating directions. The same applies to other subsequent embodiments when a winding direction of the coil 3 and a direction of a flow of a current are indicated.

The coil 32 extends over and is wound around the second tooth T2 and the third tooth T3 adjacent to each other.

Further, for the coil 32, a winding direction ("clockwise" in FIG. 3 when winding of the coil 3 is followed along the circumferential direction X between segments in contact. Hereinafter, when a winding direction of the coil 3 is indicated as "clockwise" or "counterclockwise", the same applies to the other subsequent embodiments) of the coil 32 around the second tooth T2 being one slot is opposite to a winding direction ("counterclockwise" in FIG. 3) of the coil 32 around the third tooth T3 being the other slot.

Furthermore, for the coil 32, in the circumferential direction, the coil 32 wound around the second tooth T2 being a slot at one side is connected to the segment C3 at one side of the two adjacent segments C3 and C4, and the coil 32 wound around the third tooth T3 being a slot at the other side is connected to the segment C4 at the other side of the two adjacent segments C3 and C4.

In the present embodiment, focusing on each of the plurality of slots (teeth), two coils 3 are wound around the slot (tooth), and winding directions of the two wound coils 3 are opposite to each other.

A winding direction of the coil 3 at each of the slots (teeth) will be described below in detail by using the second tooth T2 as a representative.

The two coils 3 of the coil 32 connected to the segment C3 and the coil 31 connected to the segment C2 are wound around the second tooth T2. In the second tooth T2, a winding direction (clockwise in FIG. 3) of the coil 32 and a winding direction (counterclockwise in FIG. 3) of the coil 31 are opposite to each other.

Note that, as illustrated in FIG. 2, the coil 32 is wound clockwise around the second tooth T2 at a side connected to the segment C3, is wound counterclockwise around the third tooth T3 ahead of the second tooth T2, and is further connected to the segment C4. Meanwhile, the coil 31 is wound clockwise around the first tooth T1 at a side connected to the segment C1, is wound counterclockwise around the second tooth T2 ahead of the first tooth T1, and is further connected to the segment C2.

As the slot, the second tooth T2 is described above as a representative, but a state of a wound coil, a segment connected with the coil, and a relationship with slots at one side and the other side are all similar also in the other slots (the first tooth T1 and the third tooth T3 to the fifth tooth T5).

In the present embodiment, in the circumferential direction (arrow X direction) of the commutator 4, the segments at rotationally symmetrical positions have the same potential.

In FIG. 2, when description is given by taking the segment C2 as an example, the segment C2 and the segment C7 at rotationally symmetrical positions (specifically, two-fold symmetry) in the circumferential direction (arrow X direction) of the commutator 4 are connected to each other by the connection wiring line 9, and thus have the same potential.

The relationship between the segments described above is also similar in other relationships among the segments C1 to C10 at rotationally symmetrical positions (two-fold symmetry) in the circumferential direction (the arrow X direction) of the commutator 4.

An operation of the motor 1 according to the present embodiment will be described.

Figure 4:
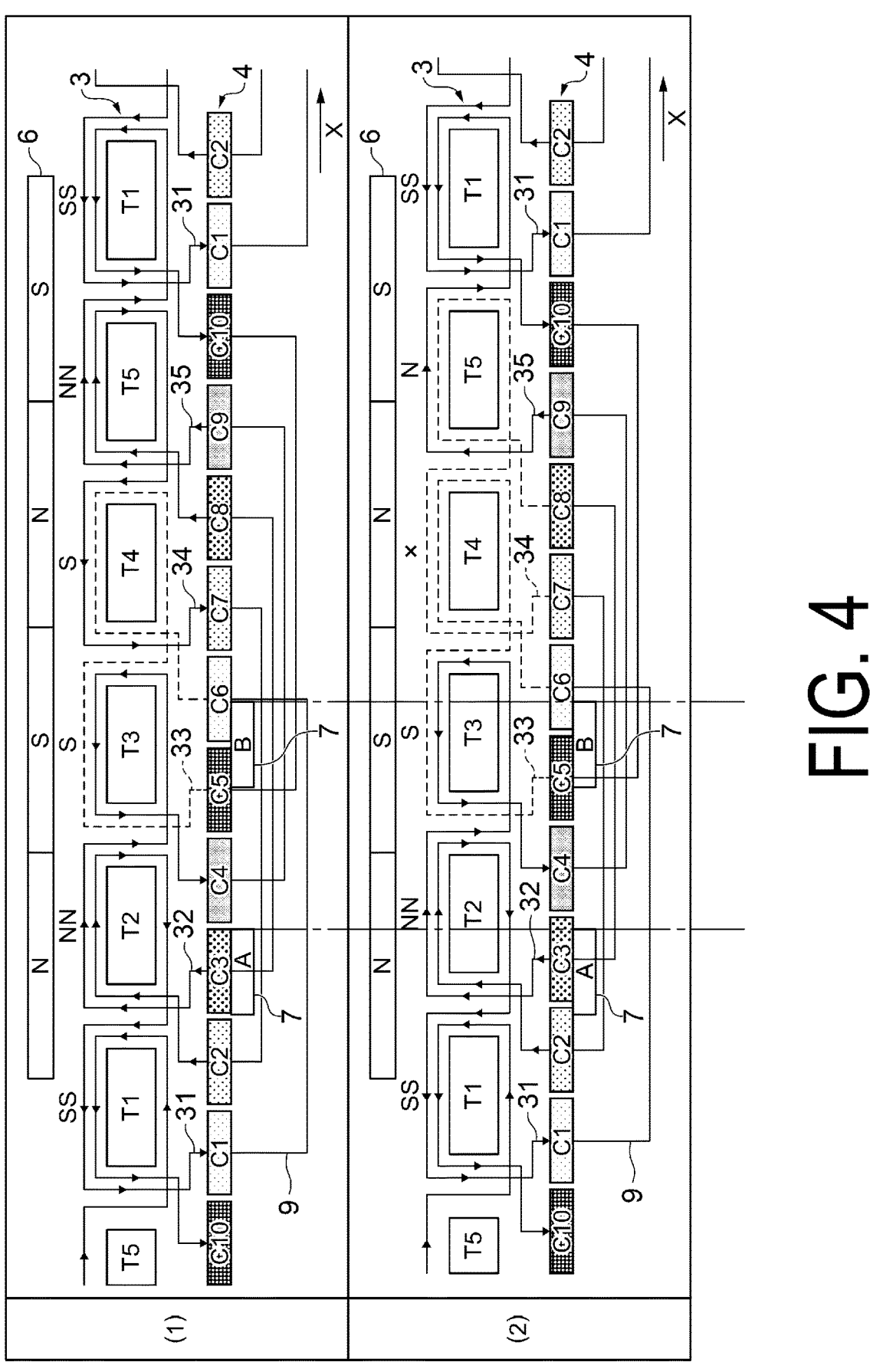
FIG. 4 is an explanatory diagram for explaining, on a time-series basis, a change in magnetic poles of slots and a movement of the components of the armature when a predetermined current or a predetermined voltage is applied to the motor according to the first embodiment, and includes a first half (1) to (2) in time series.
Figure 5:
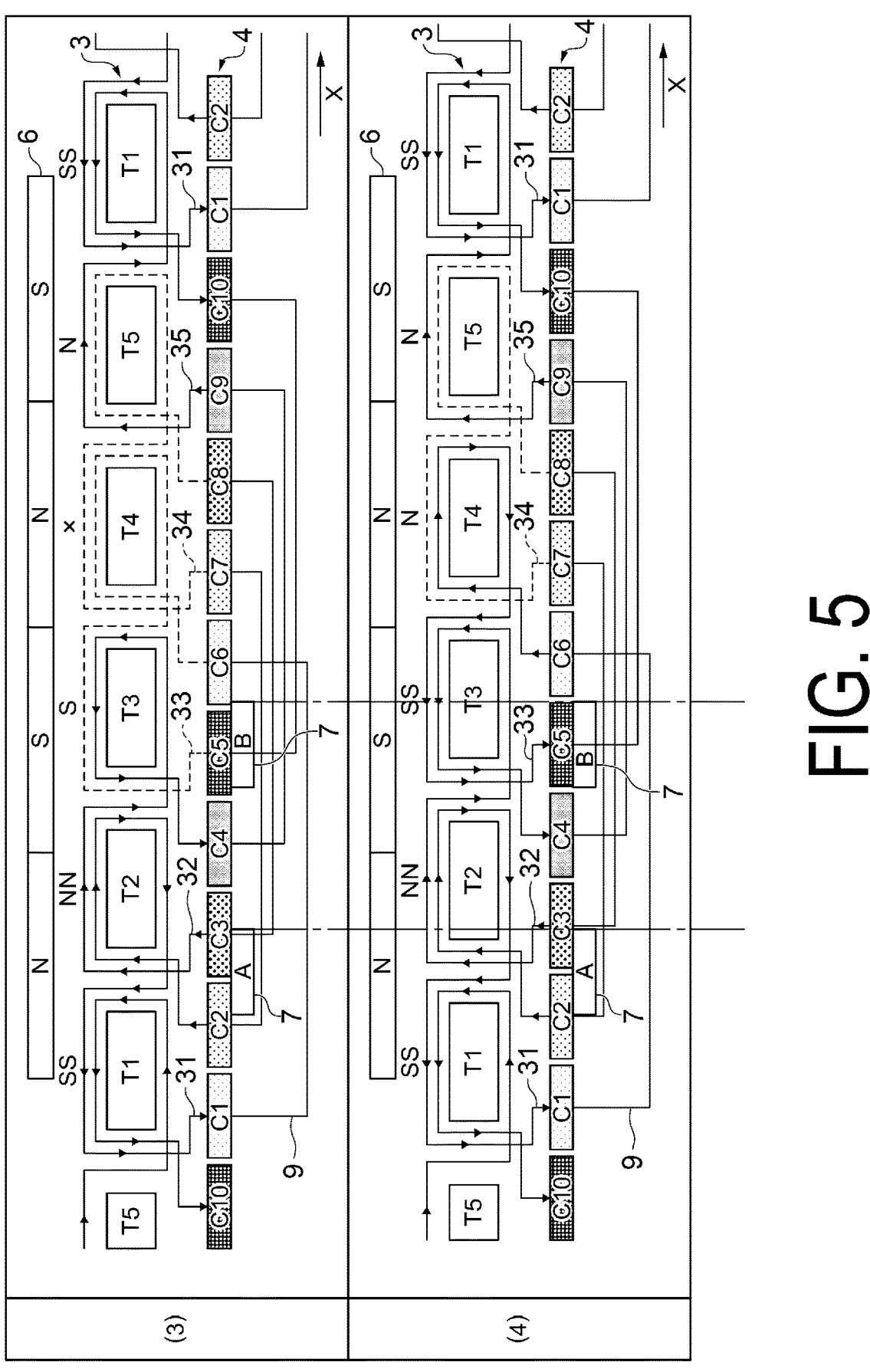
FIG. 5 is an explanatory diagram for explaining, on a time-series basis, a change in the magnetic poles of the slots and a movement of the components of the armature when a predetermined current or a predetermined voltage is applied to the motor according to the first embodiment, and includes a second half (3) to (4) in time series.

FIGS. 4 and 5 are explanatory diagrams for explaining, on a time-series basis, a change in the magnetic poles of the slot and a movement of the components of the armature 10 when a predetermined current or a predetermined voltage is applied to the motor 1 according to the present embodiment. As in the schematic view in FIG. 2, each drawing of FIGS. 4(1) to 4(2) and FIGS. 5(3) to 5(4) develops, in the left-right direction, each of the components of the armature 10 arranged in the circumferential direction, and illustrates a mutual relationship (a positional relationship and a connection relationship).

FIGS. 4 and 5 illustrate a scene where the tooth T1 to the tooth T5 being the components of the armature 10 move in the arrow X direction successively from FIG. 4(1) to FIG. 5(4) with a passage of time, and a contact state (energization state) between the contact portions A and B of the plurality of brushes 7 and the segments C1 to C10 changes.

Note that, in order to facilitate understanding of a positional relationship between the contact portions A and B of the plurality of brushes 7 and the tooth T1 to the tooth T5, a dot-and-dash line is provided as an auxiliary line at a right end of each of the contact portions A and B through each time series in FIGS. 4 and 5. This auxiliary line is also provided similarly in the explanatory diagrams for explanation on a time-series basis in the subsequent embodiments.

In FIGS. 4 and 5, the coil 3 with a current flowing is indicated by a solid line, and is provided with an arrow indicating a direction of a flow of the current. In contrast, the coil 3 without a current flowing is indicated by a broken line. Selection of a line and an arrow according to a state of a flow of a current is also similar in the explanatory diagrams in the other subsequent embodiments. Note that the connection wiring line 9 is indicated by a solid line in a wired state regardless of the presence or absence and a direction of a flow of a current.

A symbol between the magnet 6 and the tooth T1 to the tooth T5 in each drawing of FIGS. 4(1) to 4(2) and 5(3) to 5(4) represents a magnetic pole (N pole or S pole) of each of the tooth T1 to the tooth T5 in each state. Further, a place (NN, SS) having two successive Ns or two successive Ss indicates a state having a stronger magnetic field than a place (N, S) having only one N or one S. As described below, this indicates a slot in a state where currents in the same rotational direction flow through two coils wound around one tooth. Note that a place with an x sign indicates a state without application of a voltage and generation of a magnetic field.

A symbol at the place is also similar in the explanatory diagrams in the other subsequent embodiments.

First, in the state in FIG. 2, a predetermined DC voltage is applied to the contact portions A and B of the plurality of brushes 7. FIG. 4(1) illustrates a state where a predetermined DC voltage (in the present embodiment, the contact portion A is a positive pole and the contact portion B is a negative pole) is applied to the contact portions A and B in the state in FIG. 2. In the state in FIG. 4(1), the contact portion A of the plurality of brushes 7 is in a state in contact with the segment C3 of the commutator 4, and the contact portion B is in a state in contact with the segments C5 and C6.

The applied voltage is applied to each of the first to fifth coils 31 to 35 via each connection wiring line 9 according to a contact state between the plurality of brushes 7 and the commutator 4, and a current having a selected positive or negative direction flows.

Hereinafter, a flow of a current is followed with the contact portion A as a base point.

First, a current flows into the coil 32 from the contact portion A being a positive pole via the segment C3. The current flowing into the coil 32 flows clockwise around the second tooth T2, further flows counterclockwise around the third tooth T3, and reaches the segment C4. Note that, in the present embodiment, when a rotational direction of a flow of a current at each tooth is indicated, a rotational direction of a current actually flowing through a coil is used for description instead of following a coil in the arrow X direction. The same applies to the subsequent embodiments.

The current flowing into the segment C4 follows the connection wiring line 9, reaches the segment C9, and further flows into the coil 35. The current flowing into the coil 35 flows clockwise again around the fifth tooth T5, further flows counterclockwise around the first tooth T1, and reaches the segment C10.

Then, the current flowing into the segment C10 follows the connection wiring line 9, reaches the segment C5, and flows into the contact portion B being a negative pole in contact with the segment C5.

As described above, a current flowing from the contact portion A being a positive pole is returned to the contact portion B being a negative pole via each of places, and thus one electrical circuit is formed.

Meanwhile, a current applied to the contact portion A also flows into the lower connection wiring line 9 in FIG. 4(1), follows the connection wiring line 9, reaches the segment C8, and further flows into the coil 34. The current flowing into the coil 34 flows clockwise around the fifth tooth T5, further flows counterclockwise around the fourth tooth T4, and reaches the segment C7.

The current flowing into the segment C7 follows the connection wiring line 9, reaches the segment C2, and further flows into the coil 31. The current flowing into the coil 31 flows clockwise again around the second tooth T2, further flows counterclockwise around the first tooth T1, and reaches the segment C1.

Then, the current flowing into the segment C1 follows the connection wiring line 9, reaches the segment C6, and flows into the contact portion B being a negative pole in contact with the segment C6.

As described above, a current flowing from the contact portion A being a positive pole is returned to the contact portion B being a negative pole via each of places, and thus one electrical circuit is formed.

Since the contact portion B is in a state in contact with both of the segments C5 and C6, the segment C5 and the segment C6 have the same potential. Therefore, no current flows through the coil 33 connecting the segment C5 and the segment C6. In FIG. 4(1), the coil 33 without a current flowing is indicated by a broken line.

Next, in the state in FIG. 4(1), a magnetic pole of a magnetic field generated in each of the tooth T1 to the tooth T5 will be described. Note that, in the present embodiment, a magnetic pole of a magnetic field generated when a current flows clockwise through the coil 3 wound around each of the tooth T1 to the tooth T5 is the N pole, and a magnetic pole of a magnetic field generated when a current flows counterclockwise is the S pole.

In the first tooth T1, both currents flowing through the two wound coils 31 and 35 flow counterclockwise. Therefore, both magnetic poles of magnetic fields generated when the currents flow through the two coils 31 and 35 are the S pole, and the magnetic fields of the S pole are strengthened. Thus, in FIG. 4(1), SS of the strong magnetic field is indicated in the first tooth T1.

In the second tooth T2 and the fifth tooth T5, all currents flowing through the two wound coils 31 and 32 and the two wound coils 34 and 35 flow clockwise. Therefore, all magnetic poles of magnetic fields generated when the currents flow through the two coils 31 and 32 and the two coils 34 and 35 are the N pole, and the magnetic fields of the N pole are strengthened. Thus, in FIG. 4(1), NN of the strong magnetic field is indicated in the second tooth T2.

In the third tooth T3 and the fourth tooth T4, a current does not flow through the common coil 33 among the two wound coils 32 and 33 and the two wound coils 33 and 34, and currents flowing through the other coils 32 and 34 flow counterclockwise. Therefore, the currents flow only through one of the two coils 32 and 33 and one of the two coils 33 and 34, and magnetic poles of generated magnetic fields are the S pole. Thus, in FIG. 4(1), the third tooth T3 and the fourth tooth T4 are indicated by S alone.

To summarize the description above, as illustrated in FIG. 4(1), the magnetic poles of the tooth T1 to the tooth T5 are sequentially set to SS, NN, S, S, and NN (hereinafter shortened and described as the "magnetic poles of the tooth T1 to the tooth T5 are set to SS•NN•S•S•NN").

By an interaction due to attraction and repulsion between the magnetic poles of the tooth T1 to the tooth T5 and the magnetic poles of the magnet 6, the tooth (slot) T1 to the tooth (slot) T5, the first to fifth coils 31 to 35, and the segments C1 to C10 (hereinafter may be referred to as the "commutator 4 and the like) being the components of the armature 10 move in the arrow X direction, and the shaft 8 is rotated.

Note that, also in other states in FIG. 4(2) and the subsequent drawings, a state of a flow of a current and a generation state of a magnetic field in each of the tooth T1 to the tooth T5 can be easily read as in the state in FIG. 4(1) by following a contact state between the segments C1 to C5 and the contact portions A and B of the plurality of brushes 7 and a connection state of the coils 3, the connection wiring lines 9, and the like in the drawings. Therefore, in the other states in FIG. 4(2) and the subsequent drawings, detailed description of each of the drawings will be omitted. The same applies to the explanatory diagrams in the other subsequent embodiments.

When the commutator 4 and the like move to the state in FIG. 4(2), the contact portion A of one brush 7 is brought into a state in contact with the segments C2 and C3, but the contact portion B of the other brush 7 remains in a state in contact with the segments C5 and C6.

A change in the contact state between the plurality of brushes 7 and the commutator 4 also changes a state of a current (whether a current flows or does not flow, and a direction of the current when the current flows. The same applies to a case of a "state of a current" below) of the first to fifth coils 31 to 35. As a result, as illustrated in FIG. 4(2), the magnetic poles of the tooth T1 to the tooth T3 and the tooth T5 are sequentially set to SS, NN, S, and N, no current flows through the tooth T4, and the tooth T4 is brought into a state (symbol x) without generation of a magnetic field (hereinafter shortened and described as the "magnetic poles of the tooth T1 to the tooth T5 are set to SS•NN•S•x•N").

By an interaction due to attraction and repulsion between the magnetic poles of the tooth T1 to the tooth T5 and magnetic poles of the magnet 6, the commutator 4 and the like move in the arrow X direction, and rotation of the shaft 8 is maintained.

Furthermore, the commutator 4 and the like move to the state in FIG. 5(3), but a contact state between the contact portions A and B of the plurality of brushes 7 and the commutator 4 is not different from the state in FIG. 4(2). In other words, the magnetic poles of the tooth T1 to the tooth T5 are set to SS•NN•S•x•N. Thus, also in the state in FIG. 5(3), as in the case of the state in FIG. 4(2), by an interaction due to attraction and repulsion between the magnetic poles of the tooth T1 to the tooth T5 and the magnetic poles of the magnet 6, the commutator 4 and the like move in the arrow X direction, and rotation of the shaft 8 is maintained.

Next, when the commutator 4 and the like move to the state in FIG. 5(4), the contact portion A of one brush 7 remains in a state in contact with the segments C2 and C3, whereas the contact portion B of the other brush 7 is brought into a state in contact with only the segment C5. A change in the contact state between the plurality of brushes 7 and the commutator 4 also changes a state of a current flowing through the first to fifth coils 31 to 35, and as illustrated in FIG. 5(4), the magnetic poles of the tooth T1 to the tooth T5 are set to SS•NN•S•S•N•N.

By an interaction due to attraction and repulsion between the magnetic poles of the tooth T1 to the tooth T5 and the magnetic poles of the magnet 6, the commutator 4 and the like move in the arrow X direction, and rotation of the shaft 8 is maintained.

In the motor 1 according to the present embodiment, by applying a predetermined current or a predetermined voltage to the plurality of brushes 7, rotation of the commutator 4 and the like in the arrow X direction is maintained as illustrated on a time-series basis in FIGS. 4(1) to 4(2) and FIGS. 5(3) to 5(4) described above. The rotation of the commutator 4 and the like further continues, and thus rotation of the motor is maintained.

According to the motor 1 in the present embodiment, a winding direction of a coil around one slot (tooth) of two slots (teeth) wound around with the coil with the coil extending over the two slots is opposite to a winding direction of the coil around the other slot (tooth). Thus, a potential difference can be reduced between adjacent segments switching between contact and separation states with respect to a contact surface of a brush.

For example, in the state in FIG. 4(1), the contact portion A with the commutator 4 is in contact with the segment C3. When the commutator 4 and the like move to the state in FIG. 4(2) due to the rotation of the motor 1, the contact portion A is brought into contact with the segment C2 while maintaining contact with the segment C3. At this time, when a potential difference between the segment C3 and the segment C2 is relatively large, a spark is more likely to be generated.

However, in the state in FIG. 4(1), the segment C2 before contact with the contact portion A is in a state where a current flows toward the coils (32, 31), in a manner similar to the segment C3 in contact with the contact portion A. In other words, since the segment C2 and the segment C3 have the same direction of a current (or electrode) toward the coils (32, 31), a potential difference between the segment C2 and the segment C3 is small. Therefore, also when the contact portion A shifts to the state in FIG. 4(2) where the contact portion A is also in contact with the segment C2 while maintaining contact with the segment C3, generation of a spark is suppressed.

On the other hand, in a case of two coils being wound around each slot (tooth) in an overlapping manner, when directions of currents flowing through the two coils are opposite, magnetic fields generated in the coils have opposite directions and cancel each other. When magnetic fields cancel each other at one slot (tooth), a magnetic flux does not effectively act, and motor efficiency may decrease or a motor may not even rotate.

In the motor 1 according to the present embodiment, a winding direction of a coil around one slot (tooth) of two slots wound around with the coil with the coil extending over the two slots is opposite to a winding direction of the coil around the other slot (tooth). Further, winding directions of two coils wound around each slot (tooth) are opposite to each other.

Thus, when a current is applied from each segment, directions of currents flowing through two coils wound around each slot (tooth) in an overlapping manner are the same direction, or a current does not flow through one or two coils. In other words, according to the motor 1 in the present embodiment, directions of currents flowing through two coils wound around each slot (tooth) in an overlapping manner are not opposite, and a decrease in efficiency of the motor can be suppressed.

Furthermore, since the motor 1 according to the present embodiment is a four-pole motor, noise having a high frequency is reduced. In a brush motor, when the number of poles is increased too much (for example, eight poles or more), a cycle of a torque ripple may be shortened, and noise having a high frequency based on the torque ripple may be generated. However, in the present embodiment, noise having a high frequency can be suppressed by reducing the number of poles.

Second Embodiment

A motor according to the second embodiment being an example of the present invention will be described. The motor according to the second embodiment is different from the motor 1 according to the first embodiment in a configuration of a brush. Specifically, a brush 7' in the present embodiment is wider than the brush 7 in the first embodiment.

In this way, a shape of the brush is different, but the other configurations are similar to the configurations in the first embodiment. Thus, for an overall configuration of the motor according to the present embodiment, FIGS. 1 and 3 representing the motor 1 according to the first embodiment are used for reference. However, an interpretation is made with the "brush 7" replaced with the wider "brush 7'".

Figure 6:
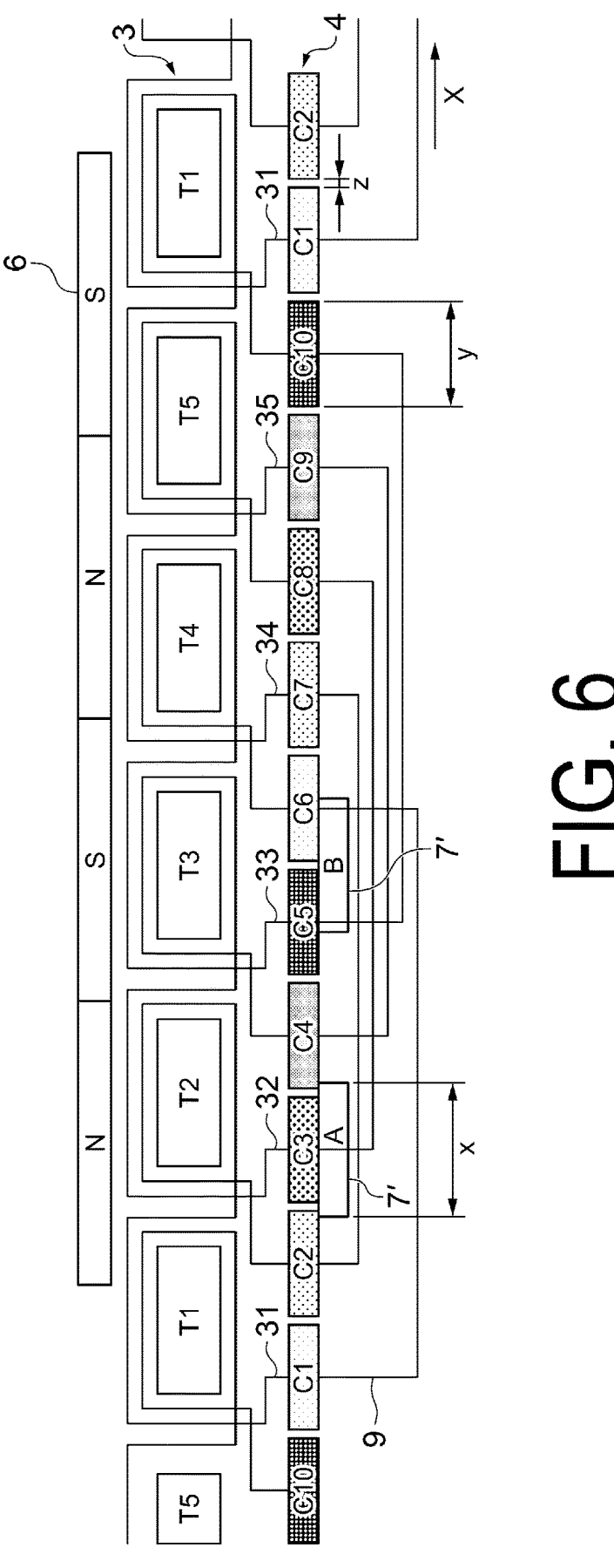
FIG. 6 is a schematic view developing, in the left-right direction, components of an armature arranged in the circumferential direction in a motor according to a second embodiment being an example of the present invention, and illustrating a mutual relationship (a positional relationship and a connection relationship).

FIG. 6 is a schematic view developing, in the left-right direction, components of an armature arranged in the circumferential direction in the motor according to the second embodiment being an example of the present invention, and illustrating a mutual relationship (a positional relationship and a connection relationship). In the present embodiment, the same reference numerals are used for the same configurations as the configurations in the first embodiment.

As illustrated in FIGS. 3 and 6, when a width of each of contact portions A and B of a plurality of the brushes 7' in contact with a commutator 4 in the circumferential direction (arrow X direction) of the commutator 4 is x, a width of each of segments (C1 to C10) in the commutator 4 is y, and a gap between two adjacent segments is z, a relational expression (2) below is satisfied in the present embodiment.

$$2y+3z>x>y+2z \qquad \text{Relational expression (2)}$$

By satisfying the relational expression (2) described above, the contact portions A and B of the plurality of brushes 7' are always in contact with two or more adjacent segments (x>y+2z), and are not in contact with four or more segments (2y+3z>x) at the same time, and thus a short circuit can be suppressed.

Figure 7:
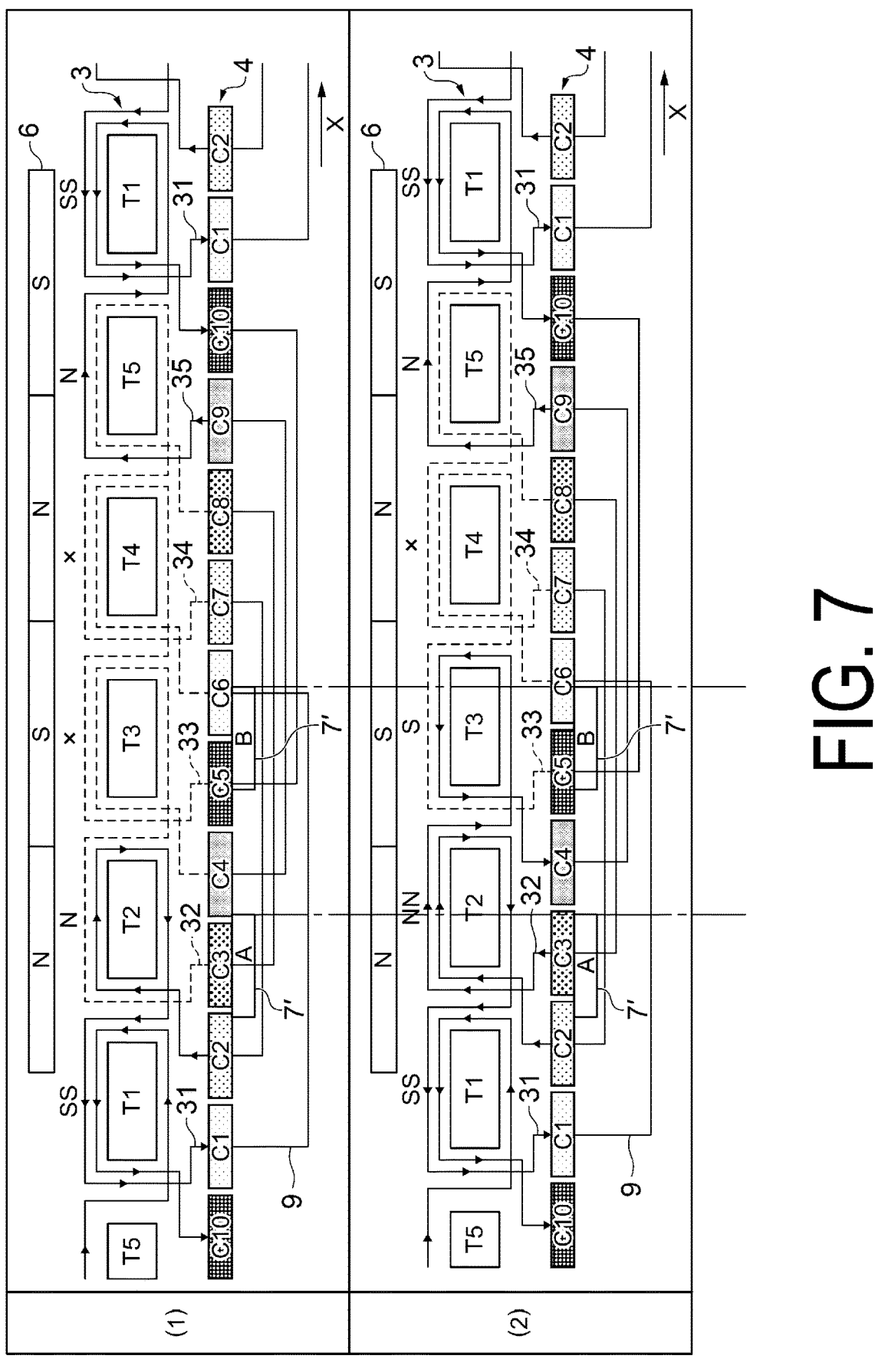
FIG. 7 is an explanatory diagram for explaining, on a time-series basis, a change in magnetic poles of slots and a movement of the components of the armature when a predetermined current or a predetermined voltage is applied to the motor according to the second embodiment, and includes a first half (1) to (2) in time series.
Figure 8:
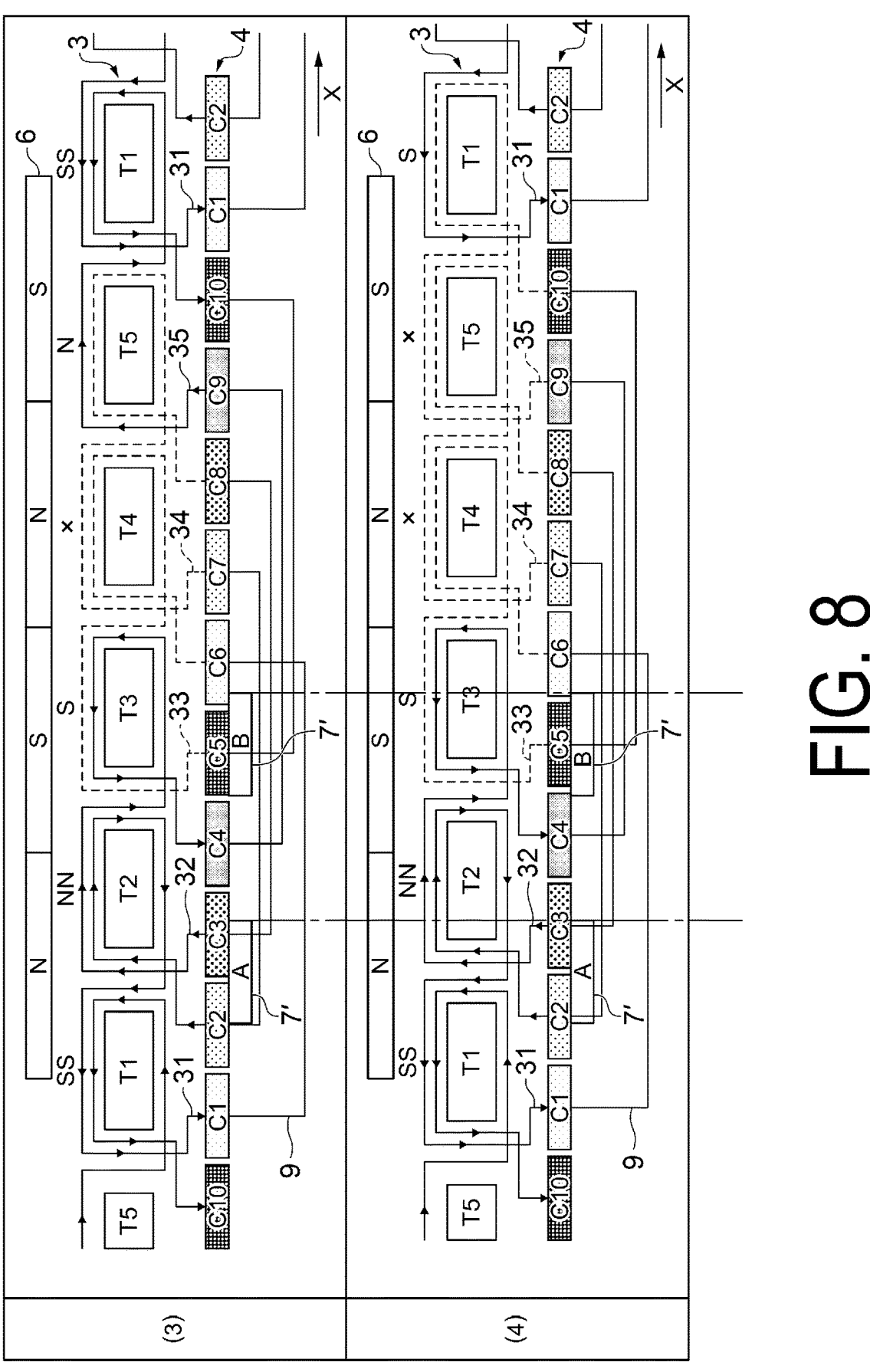
FIG. 8 is an explanatory diagram for explaining, on a time-series basis, a change in the magnetic poles of the slots and a movement of the components of the armature when a predetermined current or a predetermined voltage is applied to the motor according to the second embodiment, and includes a second half (3) to (4) in time series.

Explanatory diagrams similar to FIGS. 4 and 5 in the first embodiment are also presented as FIGS. 7 and 8 in the present embodiment, and thus detailed description of an operation of the motor according to the present embodiment will be omitted.

FIGS. 7 and 8 are explanatory diagrams for explaining, on a time-series basis, a change in magnetic poles of slots and a movement of components of an armature 10 when a predetermined current or a predetermined voltage is applied to the motor according to the present embodiment. As in the schematic view in FIG. 6, each drawing of FIGS. 7(1) to 7(2) and FIGS. 8(3) to 8(4) develops, in the left-right direction, each of the components of the armature 10 arranged in the circumferential direction, and illustrates a mutual relationship (a positional relationship and a connection relationship).

FIGS. 7 and 8 illustrate a scene where a tooth T1 to a tooth T5 being the components of the armature 10 move in the arrow X direction successively from FIG. 7(1) to FIG. 8(4) with a passage of time, and a contact state (energization state) between the contact portions A and B of the plurality of brushes 7' and the segments C1 to C10 changes.

Also in the motor according to the present embodiment, as in the first embodiment, currents having a selected positive or negative direction flow through first to fifth coils 31 to 35 via respective connection wiring lines according to a change in contact state between the plurality of brushes 7' and the commutator 4. As a result, as illustrated in each drawing of FIGS. 7(1) to 7(2) and FIGS. 8(3) to 8(4), the tooth T1 to the tooth T5 indicate respective magnetic poles. By an interaction due to attraction and repulsion between the magnetic poles of the tooth T1 to the tooth T5 and the magnetic poles of a magnet 6, the commutator 4 and the like move in the arrow X direction, and rotation of a shaft 8 is maintained.

In the motor according to the present embodiment, by applying a predetermined current or a predetermined voltage to the plurality of brushes 7', rotation of the commutator 4 and the like in the arrow X direction is maintained as illustrated on a time-series basis in FIGS. 7(1) to 7(2) and FIGS. 8(3) to 8(4) described above. The rotation of the commutator 4 and the like further continues, and thus rotation of the motor is maintained.

According to the motor in the present embodiment, a winding direction of a coil around one slot (tooth) of two slots (teeth) wound around with the coil with the coil extending over the two slots is opposite to a winding direction of the coil around the other slot (tooth). Thus, a potential difference can be reduced between adjacent segments switching between contact and separation states with respect to a contact surface of a brush.

For example, in the state in FIG. 8(3), the contact portion B with the commutator 4 is in contact with the segments C5 and C6. When the commutator 4 and the like move to the state in FIG. 8(4) due to the rotation of the motor, the contact portion B is brought into contact with the segment C4 while maintaining contact with the segment C5 and the segment C6. At this time, when a potential difference between the segment C5 and the segment C4 is relatively large, a spark is more likely to be generated.

However, in the state in FIG. 8(3), since the contact portion B is in contact with both of the segment C5 and the segment C6, the segment C5 and the segment C6 have the same potential, and no current flows between the segment C5 and the segment C6. Therefore, even when the contact portion B shifts to the state in FIG. 8(4) where the contact portion B is in contact with the segment C4 while maintaining contact with the segment C5 and the segment C6, a potential difference large enough to reverse a direction of a flowing current is not made, and generation of a spark is suppressed.

On the other hand, according to the motor in the present embodiment, a winding direction of a coil around one slot (tooth) of two slots wound around with the coil with the coil extending over the two slots is opposite to a winding direction of the coil around the other slot (tooth). Further, winding directions of two coils wound around each slot (tooth) are opposite to each other.

Thus, when a current is applied from each segment, directions of currents flowing through two coils wound around each slot (tooth) in an overlapping manner are the same direction, or a current does not flow through one or two coils. In other words, according to the motor in the present embodiment, directions of currents flowing through two coils wound around each slot (tooth) in an overlapping manner are not opposite, and a decrease in efficiency of the motor can be suppressed.

Furthermore, since the motor according to the present embodiment is a four-pole motor, noise having a high frequency is reduced. In a brush motor, when the number of poles is increased too much (for example, eight poles or more), a cycle of a torque ripple may be shortened, and noise having a high frequency based on the torque ripple may be generated. However, in the present embodiment, noise having a high frequency can be suppressed by reducing the number of poles.

Third Embodiment

A motor according to the third embodiment being an example of the present invention will be described. The motor according to the third embodiment is different from the motor 1 according to the first embodiment in a configuration of an armature. Specifically, in the present embodiment, the number of slots of a rotor core 2 is seven, and the number of segments of a commutator 4 is 14.

In this way, a shape of the armature is slightly different, but an appearance of a magnet is not changed from a cylindrical shape, and the other configurations are also similar to the configurations in the first embodiment. Thus, for an overall configuration of the motor according to the present embodiment, FIGS. 1 and 3 representing the motor 1 according to the first embodiment are used for reference. Note that the same reference numerals as the reference numerals in the first embodiment are used. For a greater number of teeth, coils, and segments, a new reference numeral is provided to an exceeding number.

Figure 9:
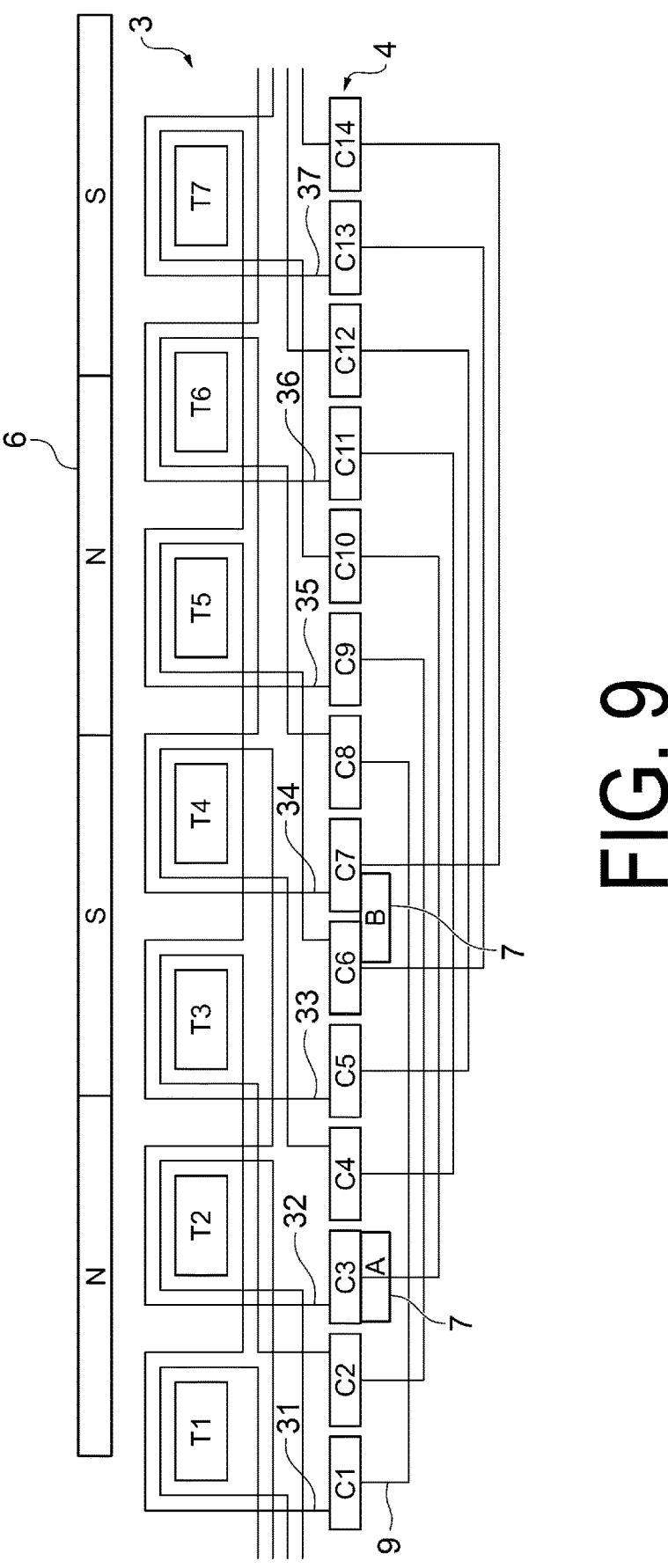
FIG. 9 is a schematic view developing, in the left-right direction, components of an armature arranged in the circumferential direction in a motor according to a third embodiment being an example of the present invention, and illustrating a mutual relationship (a positional relationship and a connection relationship).

FIG. 9 is a schematic view developing, in the left-right direction, components of the armature arranged in the circumferential direction in the motor according to the third embodiment being an example of the present invention, and illustrating a mutual relationship (a positional relationship and a connection relationship).

As illustrated in FIG. 9, the rotor core 2 includes a first tooth T1 to a seventh tooth T7 as the plurality of (seven in the present embodiment) slots arranged in the circumferential direction. Coils 31 to 37 are wound around the first tooth T1 to the seventh tooth T7, respectively. A winding direction (direction of a helix) and the like of each of the coils 31 to 37 will be described below.

The commutator 4 includes a segment C1 to a segment C14 as a plurality of segments arranged in the circumferential direction. The segment C1 to the segment C14 are configured to come into contact with contact portions A and B of a plurality of brushes 7 to be energized.

In the present embodiment, a relationship of size between the contact portions A and B of the plurality of brushes 7 and the segments (C1 to C14) of the commutator 4 satisfies the relational expression (1) described above. By satisfying the relational expression (1), as illustrated in FIG. 9, the contact portions A and B of the plurality of brushes 7 are not in contact with three or more segments at the same time, and thus a short circuit can be suppressed.

In the present embodiment, each of coils 3 extends over and is wound around two slots of the first tooth T1 to the seventh tooth T7 as the plurality of slots.

Further, for each of the coils 3, a winding direction of the coil 3 around one slot (tooth) of two slots (teeth) wound around with the coil 3 with the coil extending over the two slots is opposite to a winding direction of the coil 3 around the other slot (tooth).

Furthermore, for each of the coils 3, in the circumferential direction, the coil 3 wound around one slot (tooth) is connected to one segment of two adjacent segments, and the coil 3 wound around the other slot (tooth) is connected to the other segment of the two adjacent segments.

A winding direction of the coil 3 and connection to the segment will be described below in detail by using, as a representative, the coil 32 extending over and wound around the second tooth T2 and the fourth tooth T4 being two slots.

In the present embodiment, in the circumferential direction, the third teeth T3 being one slot different from two slots wound around with the coil 32 is located between the second teeth T2 and the fourth teeth T4 being the two slots, the coil 32 extending over the two slots.

For the coil 32, a winding direction ("clockwise" in FIG. 9) of the coil 32 around the second tooth T2 being one slot is opposite to a winding direction ("counterclockwise" in FIG. 9) of the coil 32 around the fourth tooth T4 being the other slot.

Furthermore, for the coil 32, in the circumferential direction, the coil 32 wound around the second tooth T2 being a slot at one side is connected to the segment C3 at one side of the two adjacent segments C3 and C4, and the coil 32 wound around the fourth tooth T4 being a slot at the other side is connected to the segment C4 at the other side of the two adjacent segments C3 and C4.

In the present embodiment, focusing on each of the plurality of slots (teeth), the two coils 3 are wound around the slot (tooth), and winding directions of the two wound coils 3 are opposite to each other.

A winding direction of the coil 3 at each of the slots (teeth) will be described below in detail by using the fourth tooth T4 as a representative.

The two coils 3 of the coil 34 connected to the segment C7 and the coil 32 connected to the segment C4 are wound around the fourth tooth T4. In the fourth tooth T4, a winding direction (clockwise in FIG. 9) of the coil 34 and a winding direction (counterclockwise in FIG. 9) of the coil 32 are opposite to each other.

Note that, as illustrated in FIG. 9, the coil 34 is wound clockwise around the fourth tooth T4 at a side connected to the segment C7, is wound counterclockwise around the sixth tooth T6 ahead of the fourth tooth T4, and is further connected to the segment C8. Meanwhile, the coil 32 is wound clockwise around the second tooth T2 at a side connected to the segment C3, is wound counterclockwise around the fourth tooth T4 ahead of the second tooth T2, and is further connected to the segment C4.

As the slot, the fourth tooth T4 is described above as a representative, but a state of a wound coil, a segment connected with the coil, and a relationship with slots at one side and the other side are all similar also in the other slots (the first tooth T1 to the third tooth T3 and the fifth tooth T5 to the seventh tooth T7).

In the present embodiment, in the circumferential direction (arrow X direction) of the commutator 4, the segments at rotationally symmetrical positions have the same potential.

In FIG. 9, when description is given by taking the segment C2 as an example, the segment C2 and the segment C9 at rotationally symmetrical positions (specifically, two-fold symmetry) in the circumferential direction (arrow X direction) of the commutator 4 are connected to each other by a connection wiring line 9, and thus have the same potential.

The relationship between the segments described above is also similar in other relationships among the segments C1 to C14 at rotationally symmetrical positions (two-fold symmetry) in the circumferential direction (the arrow X direction) of the commutator 4.

Figure 10:
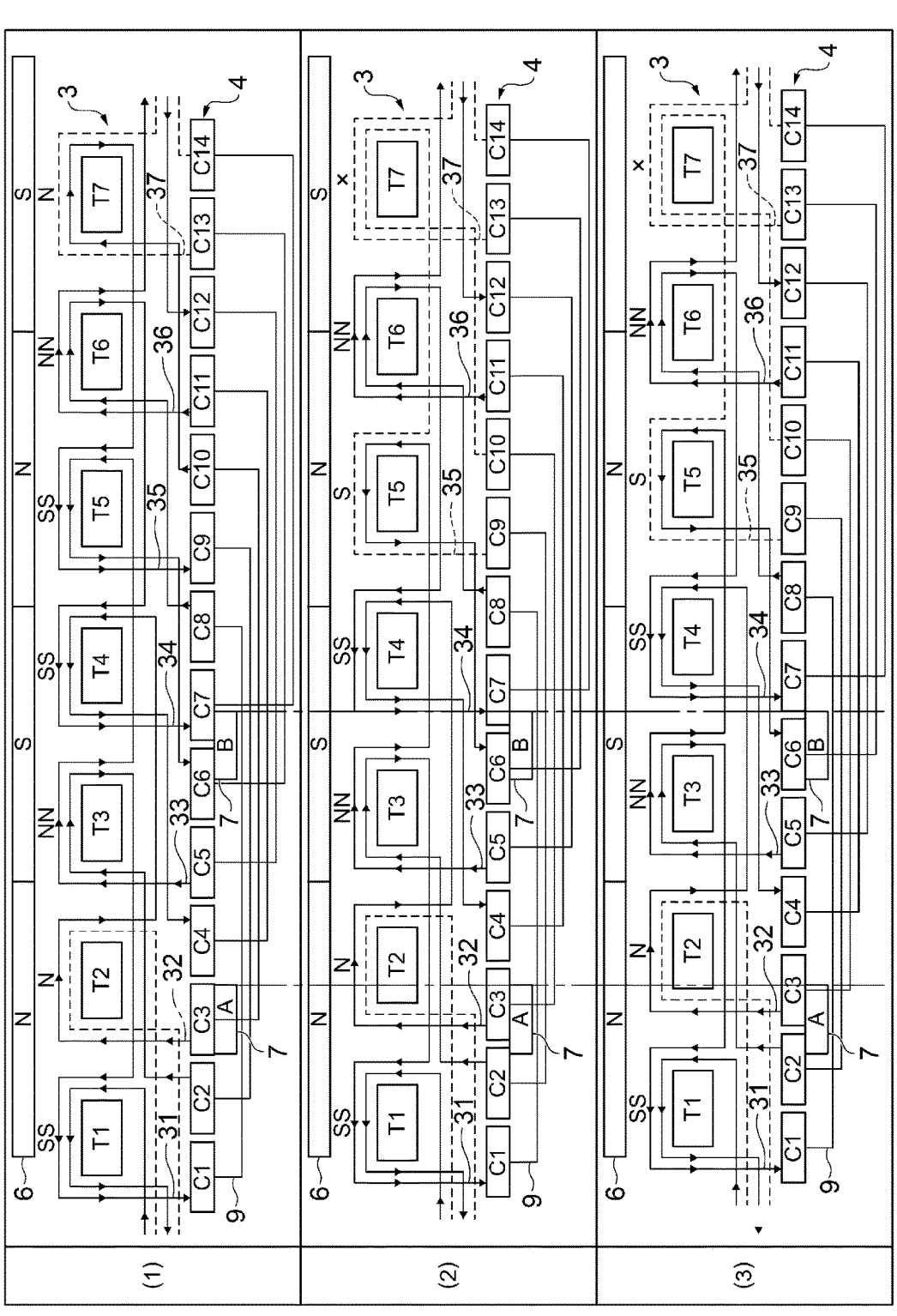
FIG. 10 is an explanatory diagram for explaining, on a time-series basis, a change in magnetic poles of slots and a movement of the components of the armature when a predetermined current or a predetermined voltage is applied to the motor according to the third embodiment, and includes a first half (1) to (3) in time series.
Figure 11:
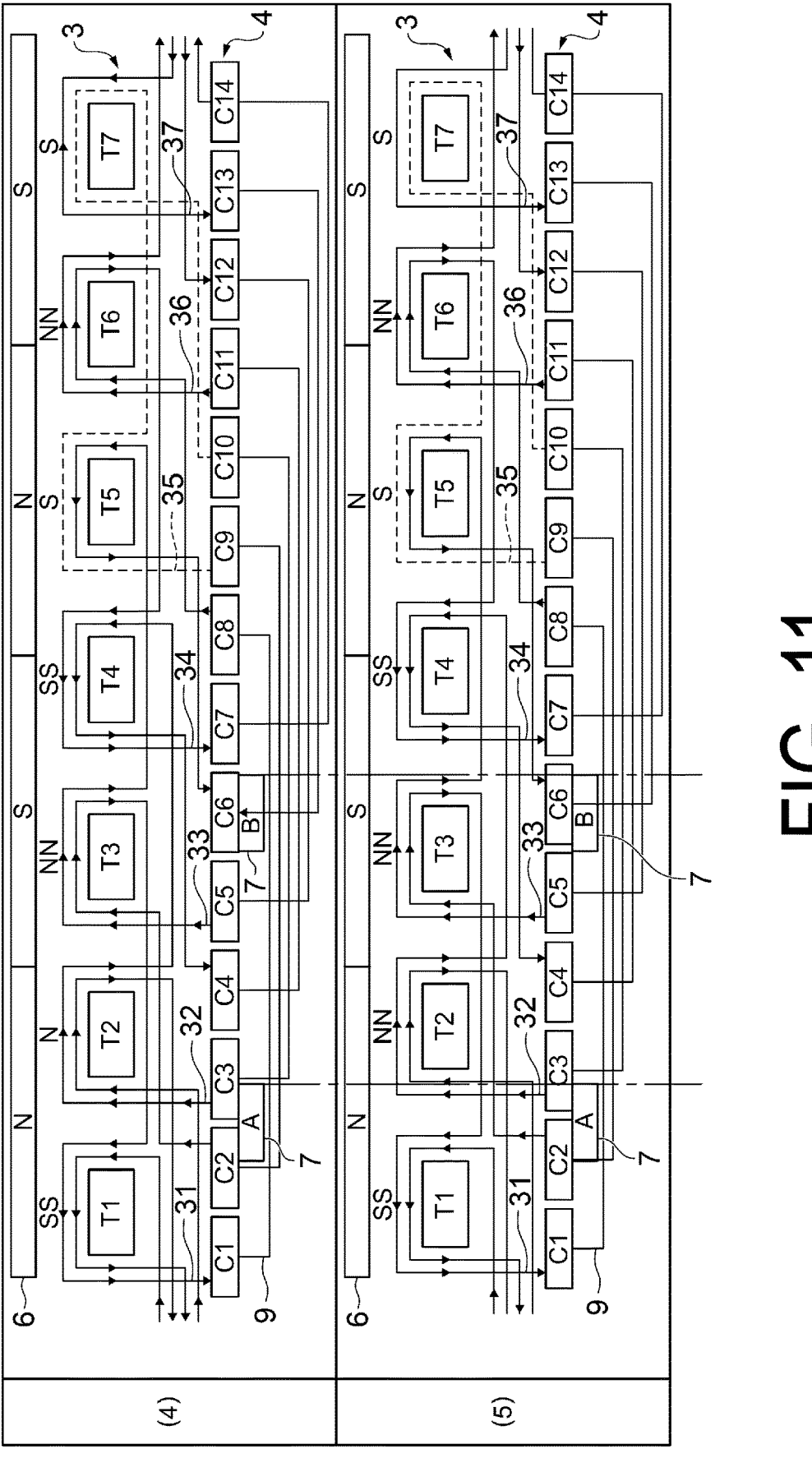
FIG. 11 is an explanatory diagram for explaining, on a time-series basis, a change in the magnetic poles of the slot and a movement of the components of the armature when a predetermined current or a predetermined voltage is applied to the motor according to the third embodiment, and includes a second half (4) to (5) in time series.

Explanatory diagrams similar to FIGS. 4 and 5 in the first embodiment are also presented as FIGS. 10 and 11 in the present embodiment, and thus detailed description of an operation of the motor according to the present embodiment will be omitted.

FIGS. 10 and 11 are explanatory diagrams for explaining, on a time-series basis, a change in magnetic poles of the slots and a movement of components of an armature 10 when a predetermined current or a predetermined voltage is applied to the motor according to the present embodiment. As in the schematic view in FIG. 9, each drawing of FIGS. 10(1) to 10(3) and FIGS. 11(4) to 11(5) develops, in the left-right direction, each of the components of the armature 10 arranged in the circumferential direction, and illustrates a mutual relationship (a positional relationship and a connection relationship).

FIGS. 10 and 11 illustrate a scene where the teeth T1 to T7 being the components of the armature 10 move in the arrow X direction successively from FIG. 10(1) to FIG. 11(5) with a passage of time, and a contact state (energization state) between the contact portions A and B of the plurality of brushes 7 and the segments C1 to C14 changes.

Also in the motor according to the present embodiment, as in the first embodiment, currents having a selected positive or negative direction flow through the first to seventh coils 31 to 37 via respective connection wiring lines according to a change in contact state between the plurality of brushes 7 and the commutator 4. As a result, as illustrated in each drawing of FIGS. 10(1) to 10(3) and FIGS. 11(4) to 11(5), the teeth T1 to T7 indicate respective magnetic poles. By an interaction due to attraction and repulsion between the magnetic poles of the teeth T1 to T7 and the magnetic poles of a magnet 6, the commutator 4 and the like move in the arrow X direction, and rotation of a shaft 8 is maintained.

In the motor according to the present embodiment, by applying a predetermined current or a predetermined voltage to the plurality of brushes 7, rotation of the commutator 4 and the like in the arrow X direction is maintained as illustrated on a time-series basis in FIGS. 10(1) to 10(3) and FIGS. 11(4) to 11(5) described above. The rotation of the commutator 4 and the like further continues, and thus rotation of the motor is maintained.

According to the motor in the present embodiment, a winding direction of a coil around one slot (tooth) of two slots (teeth) wound around with the coil with the coil extending over the two slots is opposite to a winding direction of the coil around the other slot (tooth). Thus, a potential difference can be reduced between adjacent segments switching between contact and separation states with respect to a contact surface of a brush.

For example, in the state in FIG. 10(1), the contact portion A with the commutator 4 is in contact with the segment C3. When the commutator 4 and the like move to the state in FIG. 10(2) due to the rotation of the motor, the contact portion A is brought into contact with the segment C2 while maintaining contact with the segment C3. At this time, when a potential difference between the segment C3 and the segment C2 is relatively large, a spark is more likely to be generated.

However, in the state in FIG. 10(1), the segment C2 before contact with the contact portion A is in a state where a current flows toward the coils (32, 31), in a manner similar to the segment C3 in contact with the contact portion A. In other words, since the segment C2 and the segment C3 have the same direction (or electrode) of a current toward the coils (32, 31), a potential difference between the segment C2 and the segment C3 is small. Therefore, also when the contact portion A shifts to the state in FIG. 10(2) where the contact portion A is also in contact with the segment C2 while maintaining contact with the segment C3, generation of a spark is suppressed.

On the other hand, according to the motor in the present embodiment, a winding direction of a coil around one slot (tooth) of two slots wound around with the coil with the coil extending over the two slots is opposite to a winding direction of the coil around the other slot (tooth). Further, winding directions of two coils wound around each slot (tooth) are opposite to each other.

Thus, when a current is applied from each segment, directions of currents flowing through two coils wound around each slot (tooth) in an overlapping manner are the same direction, or a current does not flow through one or two coils. In other words, according to the motor in the present embodiment, directions of currents flowing through two coils wound around each slot (tooth) in an overlapping manner are not opposite, and a decrease in efficiency of the motor can be suppressed.

Furthermore, since the motor according to the present embodiment is a four-pole motor, noise having a high frequency is reduced. In a brush motor, when the number of poles is increased too much (for example, eight poles or more), a cycle of a torque ripple may be shortened, and noise having a high frequency based on the torque ripple may be generated. However, in the present embodiment, noise having a high frequency can be suppressed by reducing the number of poles.

Fourth Embodiment

A motor according to the fourth embodiment being an example of the present invention will be described. The motor according to the fourth embodiment is different from the motor 1 according to the first embodiment in a configuration of an armature. Specifically, in the present embodiment, the number of slots of a rotor core 2 is nine, and the number of segments of a commutator 4 is 18.

In this way, a shape of the armature is slightly different, but an appearance of a magnet is not changed from a cylindrical shape, and the other configurations are also similar to the configurations in the first embodiment. Thus, for an overall configuration of the motor according to the present embodiment, FIGS. 1 and 3 representing the motor 1 according to the first embodiment are used for reference. Note that the same reference numerals as the reference numerals in the first embodiment are used. For a greater number of teeth, coils, and segments, a new reference numeral is provided to an exceeding number.

Figure 12:
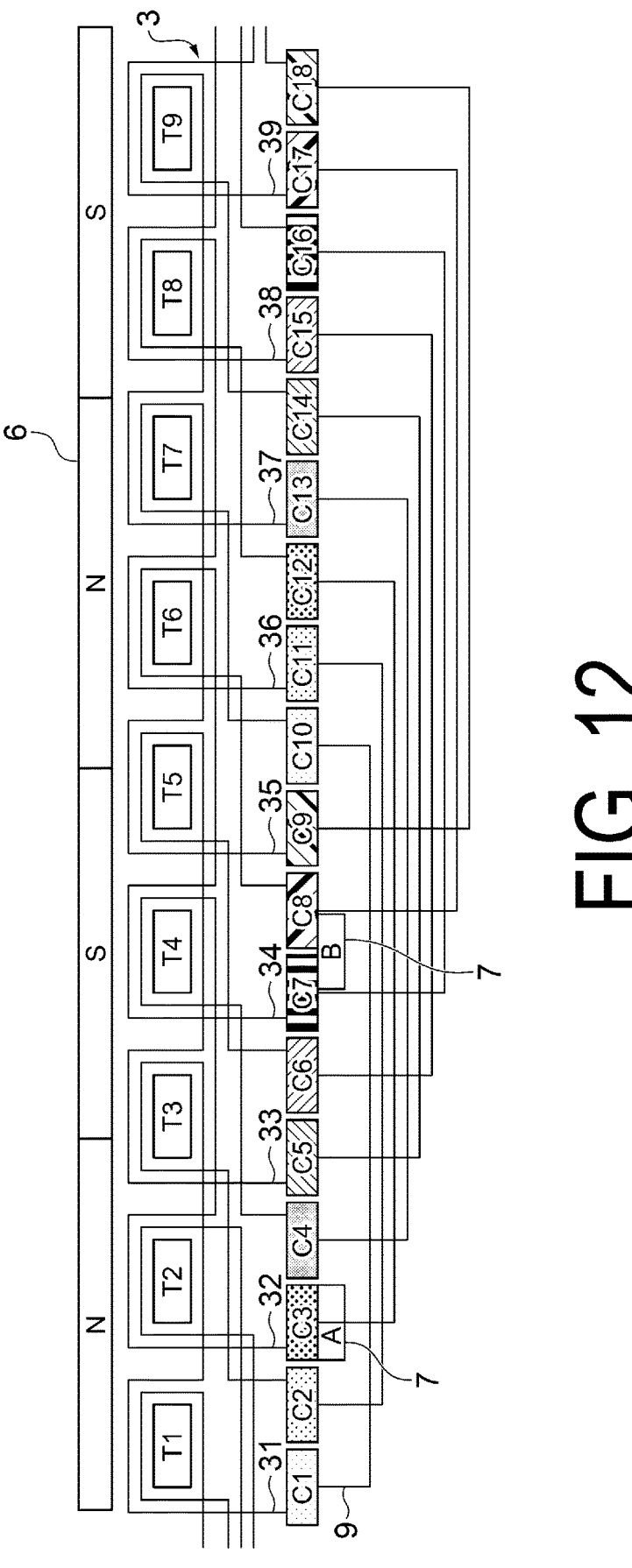
FIG. 12 is a schematic view developing, in the left-right direction, components of an armature arranged in the circumferential direction in a motor according to a fourth embodiment being an example of the present invention, and illustrating a mutual relationship (a positional relationship and a connection relationship).

FIG. 12 is a schematic view developing, in the left-right direction, components of the armature arranged in the circumferential direction in the motor according to the fourth embodiment being an example of the present invention, and illustrating a mutual relationship (a positional relationship and a connection relationship).

As illustrated in FIG. 12, the rotor core 2 includes a first tooth T1 to a ninth tooth T9 as the plurality of (nine in the present embodiment) slots arranged in the circumferential direction. Coils 31 to 39 are wound around the first tooth T1 to the ninth tooth T9, respectively. A winding direction (direction of a helix) and the like of each of the coils 31 to 39 will be described below.

The commutator 4 includes a segment C1 to a segment C18 as the plurality of segments arranged in the circumferential direction. The segment C1 to the segment C18 are configured to come into contact with contact portions A and B of a plurality of brushes 7 to be energized.

In the present embodiment, a relationship of size between the contact portions A and B of the plurality of brushes 7 and the segments (C1 to C18) in the commutator 4 satisfies the relational expression (1) described above. By satisfying the relational expression (1), as illustrated in FIG. 12, the contact portions A and B of the plurality of brushes 7 are not in contact with three or more segments at the same time, and thus a short circuit can be suppressed.

In the present embodiment, each of coils 3 extends over and is wound around two slots of the first tooth T1 to the ninth tooth T9 as the plurality of slots.

Further, for each of the coils 3, a winding direction of the coil 3 around one slot (tooth) of two slots (teeth) wound around with the coil 3 with the coil 3 extending over the two slots is opposite to a winding direction of the coil 3 around the other slot (tooth).

Furthermore, for each of the coils 3, in the circumferential direction, the coil 3 wound around one slot (tooth) is connected to one segment of two adjacent segments, and the coil 3 wound around the other slot (tooth) is connected to the other segment of the two adjacent segments.

A winding direction of the coil 3 and connection to the segment will be described below in detail by using, as a representative, the coil 32 extending over and wound around the second tooth T2 and the fourth tooth T4 being two slots.

In the present embodiment, in the circumferential direction, the third teeth T3 being one slot different from two slots wound around with the coil 32 is located between the second teeth T2 and the fourth teeth T4 being the two slots, the coil 32 extending over the two slots.

For the coil 32, a winding direction ("clockwise" in FIG. 12) of the coil 32 around the second tooth T2 being one slot is opposite to a winding direction ("counterclockwise" in FIG. 12) of the coil 32 around the fourth tooth T4 being the other slot.

Furthermore, for the coil 32, in the circumferential direction, the coil 32 wound around the second tooth T2 being a slot at one side is connected to the segment C3 at one side of the two adjacent segments C3 and C4, and the coil 32 wound around the fourth tooth T4 being a slot at the other side is connected to the segment C4 at the other side of the two adjacent segments C3 and C4.

In the present embodiment, focusing on each of the plurality of slots (teeth), two coils 3 are wound around the slot (tooth), and winding directions of the two wound coils 3 are opposite to each other.

A winding direction of the coil 3 at each of the slots (teeth) will be described below in detail by using the fourth tooth T4 as a representative.

The two coils 3 of the coil 34 connected to the segment C7 and the coil 32 connected to the segment C4 are wound around the fourth tooth T4. In the fourth tooth T4, a winding direction (clockwise in FIG. 12) of the coil 34 and a winding direction (counterclockwise in FIG. 12) of the coil 32 are opposite to each other.

Note that, as illustrated in FIG. 12, the coil 34 is wound clockwise around the fourth tooth T4 at a side connected to the segment C7, is wound counterclockwise around the sixth tooth T6 ahead of the fourth tooth T4, and is further connected to the segment C8. Meanwhile, the coil 32 is wound clockwise around the second tooth T2 at a side connected to the segment C3, is wound counterclockwise around the fourth tooth T4 ahead of the second tooth T2, and is further connected to the segment C4.

As the slot, the fourth tooth T4 is described above as a representative, but a state of a wound coil, a segment connected with the coil, and a relationship with slots at one side and the other side are all similar also in the other slots (the first tooth T1 to the third tooth T3 and the fifth tooth T5 to the ninth tooth T9).

In the present embodiment, in the circumferential direction (arrow X direction) of the commutator 4, the segments at rotationally symmetrical positions have the same potential.

In FIG. 12, when description is given by taking the segment C2 as an example, the segment C2 and the segment C11 at rotationally symmetrical positions (specifically, two-fold symmetry) in the circumferential direction (arrow X direction) of the commutator 4 are connected to each other by a connection wiring line 9, and thus have the same potential.

The relationship between the segments described above is also similar in other relationships among the segments C1 to C18 at rotationally symmetrical positions (two-fold symmetry) in the circumferential direction (the arrow X direction) of the commutator 4.

Figure 13:
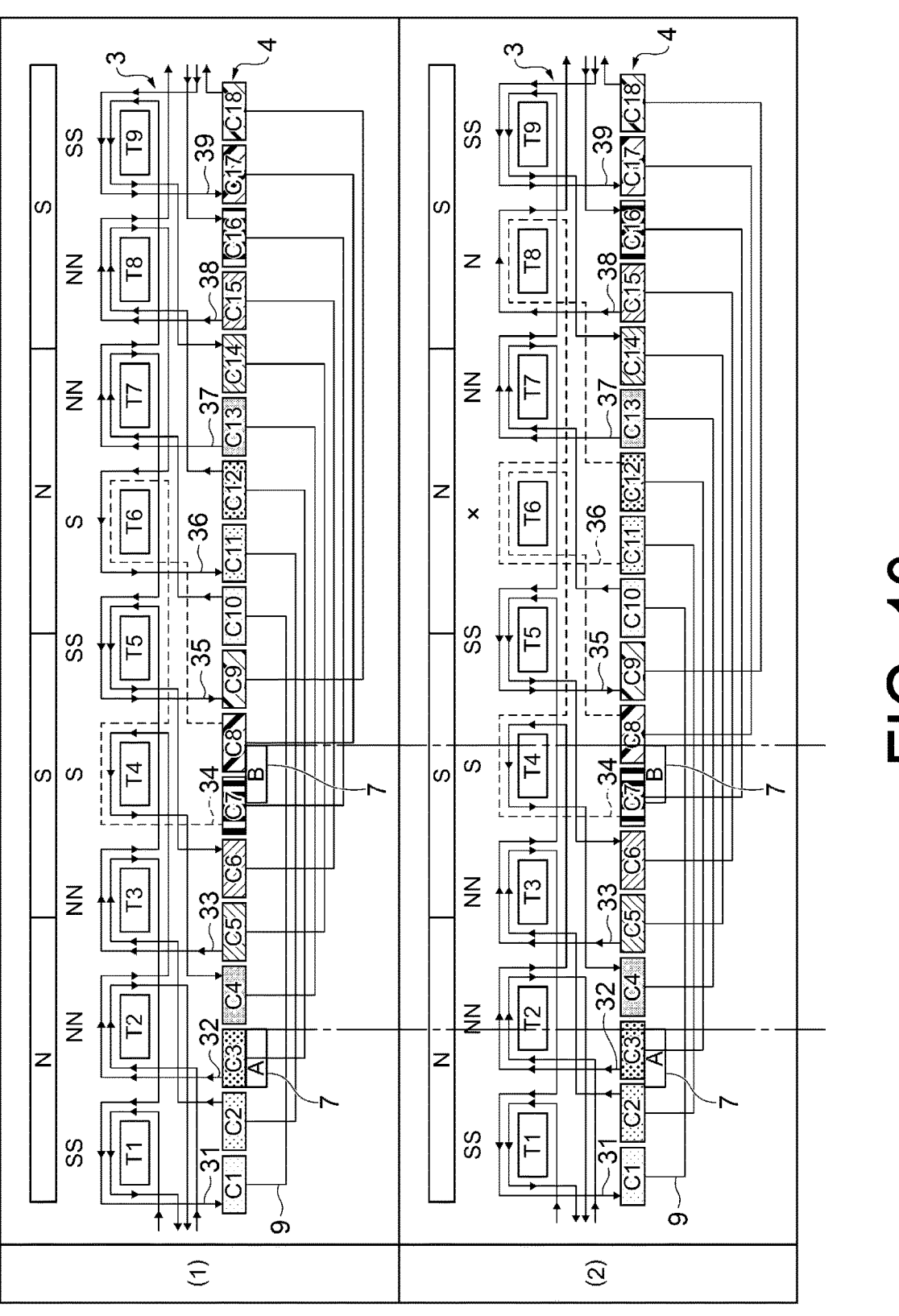
FIG. 13 is an explanatory diagram for explaining, on a time-series basis, a change in magnetic poles of slots and a movement of the components of the armature when a predetermined current or a predetermined voltage is applied to the motor according to the fourth embodiment, and includes a first half (1) to (2) in time series.
Figure 14:
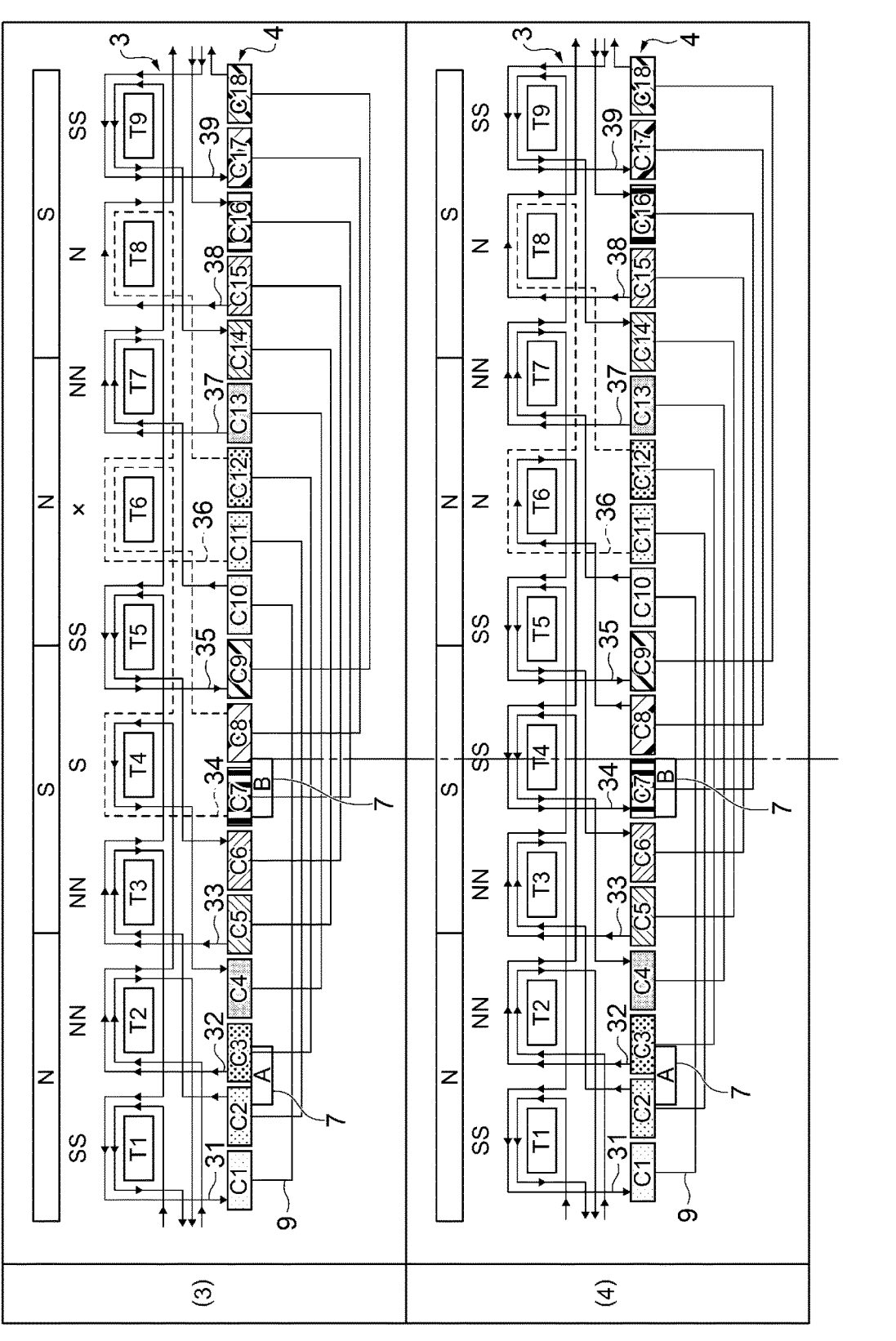
FIG. 14 is an explanatory diagram for explaining, on a time-series basis, a change in the magnetic poles of the slots and a movement of the components of the armature when a predetermined current or a predetermined voltage is applied to the motor according to the fourth embodiment, and includes a second half (3) to (4) in time series.

Explanatory diagrams similar to FIGS. 4 and 5 in the first embodiment are also presented as FIGS. 13 and 14 in the present embodiment, and thus detailed description of an operation of the motor according to the present embodiment will be omitted.

FIGS. 13 and 14 are explanatory diagrams for explaining, on a time-series basis, a change in magnetic poles of the slots and a movement of components of an armature 10 when a predetermined current or a predetermined voltage is applied to the motor according to the present embodiment. As in the schematic view in FIG. 12, each drawing of FIGS. 13(1) to 13(2) and FIGS. 14(3) to 14(4) develops, in the left-right direction, each of the components of the armature 10 arranged in the circumferential direction, and illustrates a mutual relationship (a positional relationship and a connection relationship).

FIGS. 13 and 14 illustrate a scene where the teeth T1 to T9 being the components of the armature 10 move in the arrow X direction successively from FIG. 13(1) to FIG. 14(4) with a passage of time, and a contact state (energization state) between the contact portions A and B of the plurality of brushes 7 and the segments C1 to C18 changes.

Also in the motor according to the present embodiment, as in the first embodiment, currents having a selected positive or negative direction flow through the first to ninth coils 31 to 39 via respective connection wiring lines according to a change in contact state between the plurality of brushes 7 and the commutator 4. As a result, as illustrated in each drawing of FIGS. 13(1) to 13(2) and FIGS. 14(3) to 14(4), the teeth T1 to T9 indicate respective magnetic poles. By an interaction due to attraction and repulsion between the magnetic poles of the teeth T1 to T9 and the magnetic poles of a magnet 6, the commutator 4 and the like move in the arrow X direction, and rotation of a shaft 8 is maintained.

In the motor according to the present embodiment, by applying a predetermined current or a predetermined voltage to the plurality of brushes 7, rotation of the commutator 4 and the like in the arrow X direction is maintained as illustrated on a time-series basis in FIGS. 13(1) to 13(2) and FIGS. 14(3) to 14(4) described above. The rotation of the commutator 4 and the like further continues, and thus rotation of the motor is maintained.

According to the motor in the present embodiment, a winding direction of a coil around one slot (tooth) of two slots (teeth) wound around with the coil with the coil extending over the two slots is opposite to a winding direction of the coil around the other slot (tooth). Thus, a potential difference can be reduced between adjacent segments switching between contact and separation states with respect to a contact surface of a brush.

For example, in the state in FIG. 13(1), the contact portion A with the commutator 4 is in contact with the segment C3. When the commutator 4 and the like move to the state in FIG. 13(2) due to the rotation of the motor, the contact portion A is brought into contact with the segment C2 while maintaining contact with the segment C3. At this time, when a potential difference between the segment C3 and the segment C2 is relatively large, a spark is more likely to be generated.

However, in the state in FIG. 13(1), the segment C2 before contact with the contact portion A is in a state where a current flows toward the coils (32, 31), in a manner similar to the segment C3 in contact with the contact portion A. In other words, since the segment C2 and the segment C3 have the same direction of a current (or electrode) toward the coils (32, 31), a potential difference between the segment C2 and the segment C3 is small. Therefore, also when the contact portion A shifts to the state in FIG. 13(2) where the contact portion A is also in contact with the segment C2 while maintaining contact with the segment C3, generation of a spark is suppressed.

On the other hand, according to the motor in the present embodiment, a winding direction of a coil around one slot (tooth) of two slots wound around with the coil with the coil extending over the two slots is opposite to a winding direction of the coil around the other slot (tooth). Further, winding directions of two coils wound around each slot (tooth) are opposite to each other.

Thus, when a current is applied from each segment, directions of currents flowing through two coils wound around each slot (tooth) in an overlapping manner are the same, or a current does not flow through one or two coils. In other words, according to the motor in the present embodiment, directions of currents flowing through two coils wound around each slot (tooth) in an overlapping manner are not opposite, and a decrease in efficiency of the motor can be suppressed.

Furthermore, since the motor according to the present embodiment is a four-pole motor, noise having a high frequency is reduced. In a brush motor, when the number of poles is increased too much (for example, eight poles or more), a cycle of a torque ripple may be shortened, and noise having a high frequency based on the torque ripple may be generated.

However, in the present embodiment, noise having a high frequency can be suppressed by reducing the number of poles.

Fifth Embodiment

A motor according to the fifth embodiment being an example of the present invention will be described. The motor according to the fifth embodiment is different from the motor 1 according to the first embodiment in a configuration of a brush and a coil.

Specifically, a brush 7″ in the present embodiment is narrower than the brush 7 in the first embodiment, and a contact portion of the brush 7″ is also disposed at a different position in the circumferential direction. Further, connection of coils 3 to segments C1 to C10 are also displaced from the connection in the first embodiment in the circumferential direction.

In this way, a shape and an arrangement of the brush are different, but the other configurations are similar to the configurations in the first embodiment. Thus, for an overall configuration of the motor according to the present embodiment, FIGS. 1 and 3 representing the motor 1 according to the first embodiment are used for reference. However, an interpretation is made with the "brush 7" replaced with the narrower "brush 7″" and with an arrangement changed.

Figure 15:
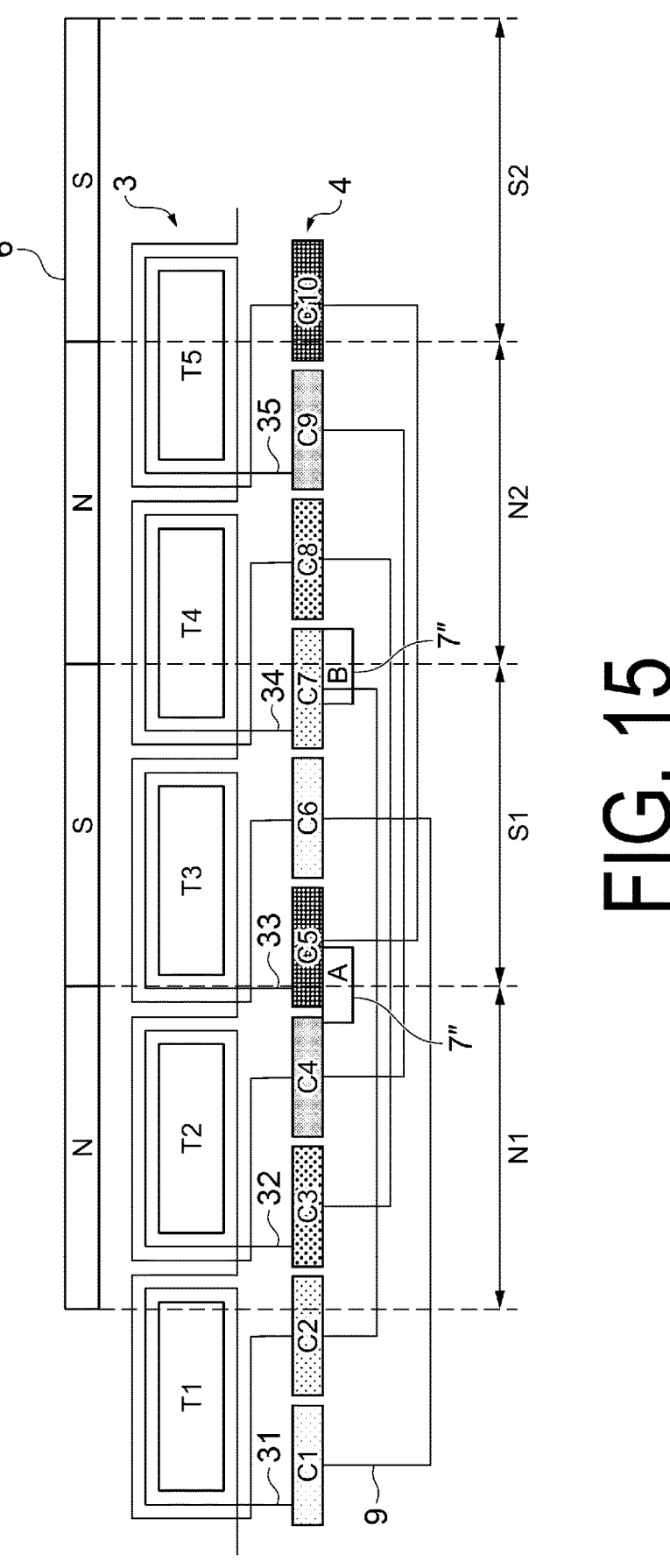
FIG. 15 is a schematic view developing, in the left-right direction, components of an armature arranged in the circumferential direction in a motor according to a fifth embodiment being an example of the present invention, and illustrating a mutual relationship (a positional relationship and a connection relationship).

FIG. 15 is a schematic view developing, in the left-right direction, components of an armature arranged in the circumferential direction in the motor according to the fifth embodiment being an example of the present invention, and illustrating a mutual relationship (a positional relationship and a connection relationship). In the present embodiment, the same reference numerals are used for the same configurations as the configurations in the first embodiment.

When the "brush 7" in FIG. 3 is replaced with the "brush 7″" in FIG. 15, a width of each of contact portions A and B of a plurality of the brushes 7″ in contact with a commutator 4 in the circumferential direction (arrow X direction) of the commutator 4 is x, a width of each of the segments (C1 to C10) in the commutator 4 is y, and a gap between two adjacent segments is z, the plurality of brushes 7″ in the present embodiment satisfy the relational expression (1) below as in the first embodiment.

$$x < y + 2z \qquad \text{Relational expression (1)}$$

By satisfying the relational expression (1) described above, as illustrated in FIG. 15, the contact portions A and B of the plurality of brushes 7″ are not in contact with three or more segments at the same time, and thus a short circuit can be suppressed.

In the present embodiment, a magnet 6 has two different magnetic poles (S pole and N pole) alternately arranged in the circumferential direction as in the first embodiment.

In the circumferential direction, a contact surface of the commutator 4 in contact with each of the contact portions A and B of the brushes 7″ can be considered to include regions, the regions corresponding to the two different magnetic poles of the magnet 6.

In other words, as illustrated in FIG. 15, the contact surface (a surface connecting the segments C1 to C10 and gaps between the segments, and an outer surface of the commutator 4 having a linear shape including lower surfaces of the segments C1 to C10 in FIG. 15, but actually having a columnar shape) of the commutator 4 can be considered to include regions N1, S1, N2, and S2, each of the regions N1, S1, N2, and S2 corresponding to the two different magnetic poles of the magnet 6 in the circumferential direction. Note that, in FIG. 15, the contact surface of the commutator 4 including the segment C1 and a part of the segment C2 protruding from the region N1 to the left side actually corresponds to the region S2 at the right side.

Then, the contact portion A of the brush 7″ is in contact with the commutator 4 across the region N1 and the region S1. Further, the contact portion B of the brush 7″ is in contact with the commutator 4 across the region S1 and the region N2. In contrast, in the first embodiment, the contact portion A of the brush 7 is in contact with the commutator 4 at the center of a region corresponding to the region N1, and the contact portion B is in contact with the commutator 4 at the center of a region corresponding to the region S1. Thus, the first embodiment is different from the present embodiment.

Also in the present embodiment, focusing on each of a plurality of slots (teeth), two coils 3 are wound around the slot (tooth), and winding directions of the two wound coils 3 are opposite to each other.

A winding direction of the coil 3 at each of the slots (teeth) will be described below in detail by using the second tooth T2 as a representative.

The two coils 3 of a coil 33 connected to the segment C4 and a coil 32 connected to the segment C3 are wound around a second tooth T2. In the second tooth T2, a winding direction (clockwise in FIG. 15) of the coil 33 and a winding direction (counterclockwise in FIG. 15) of the coil 32 are opposite to each other.

Note that, as illustrated in FIG. 15, the coil 33 is wound clockwise around the second tooth T2 at a side connected to the segment C4, is wound counterclockwise around a third tooth T3 ahead of the second tooth T2, and is further connected to the segment C5. Meanwhile, the coil 32 is wound clockwise around a first tooth T1 at a side connected to the segment C2, is wound counterclockwise around the second tooth T2 ahead of the first tooth T1, and is further connected to the segment C3.

As the slot, the second tooth T2 is described above as a representative, but a state of a wound coil, a segment connected with the coil, and a relationship with slots at one side and the other side are all similar also in the other slots (the first tooth T1 and the third tooth T3 to a fifth tooth T5).

Figure 16:
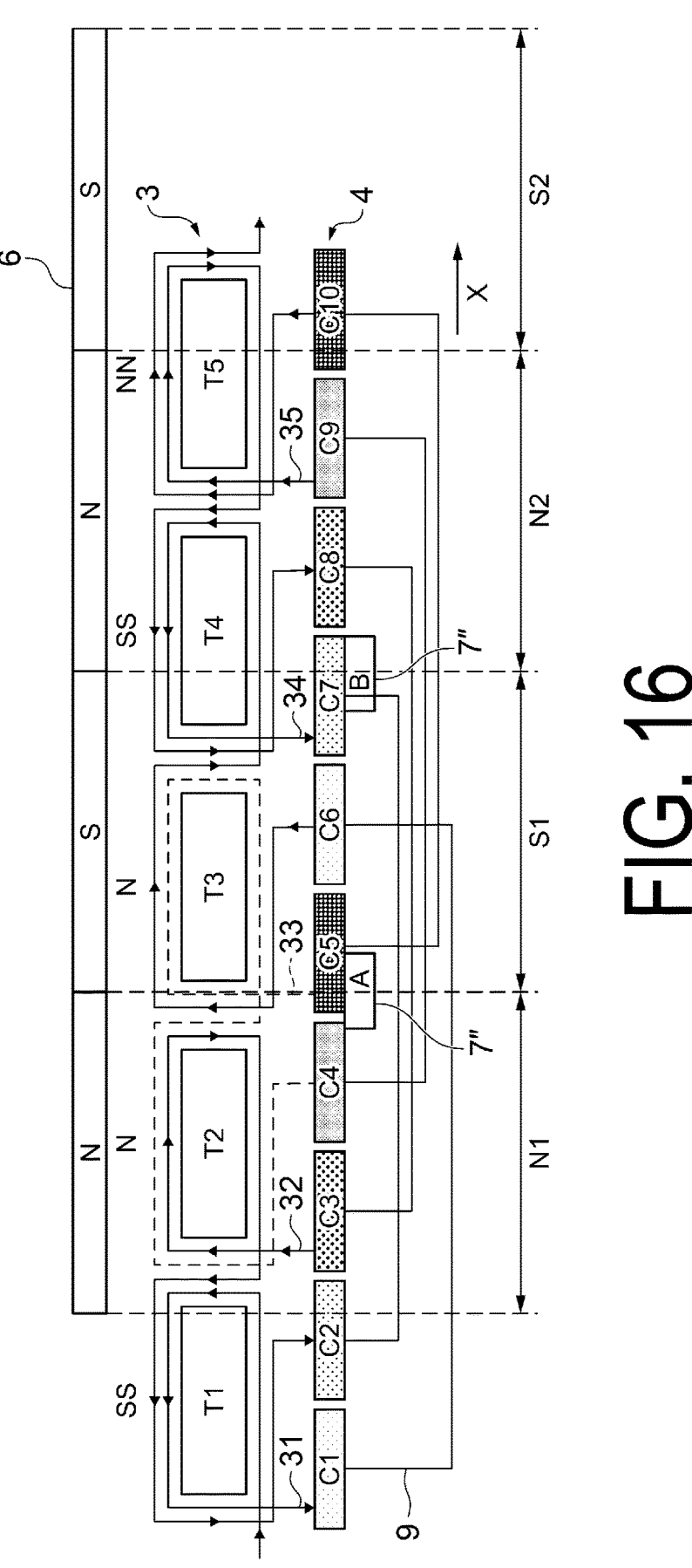
FIG. 16 is a schematic view illustrating only a state of a flow of a current when a predetermined current or a predetermined voltage is applied to the motor according to the fifth embodiment.

FIG. 16 illustrates a schematic view illustrating only a state of a flow of a current when a predetermined current or a predetermined voltage is applied to the motor according to the present embodiment. In FIG. 16, the magnet 6 and the plurality of brushes 7" are fixed members, and the teeth T1 to T5 wound around with the coils 3 being the armature, and connection wiring lines 9 move in the arrow X direction relative to the fixed members.

In the state in FIG. 16, the contact portion A of the plurality of brushes 7" is in a state in contact with the segments C4 and C5 of the commutator 4, and the contact portion B is in a state in contact with the segment C7. In this state, as illustrated in FIG. 16, a current flows through each coil and the connection wiring line 9 in the arrow direction, and a current does not flow through a place indicated by a broken line. As a result, in the state in FIG. 16, magnetic poles of the teeth T1 to T5 are set to SS•N•N•SS•NN.

By an interaction due to attraction and repulsion between the magnetic poles of the teeth T1 to T5 and the magnetic poles of the magnet 6, the commutator 4 and the like move in the arrow X direction, and the shaft 8 rotates.

In the present embodiment, except that a width of the brush 7" is narrower and a position of the contact portion of the brush 7" is different (displaced), the configuration is the same as the configuration of the first embodiment, and wiring (connection) of the coil 3 and the connection wiring line 9 is also the same. Therefore, the motor according to the present embodiment is driven in a manner similar to the motor 1 in the first embodiment, and has functions and the like similar to the functions of the motor 1. Therefore, detailed description of the present embodiment will be omitted (see the description of the first embodiment). However, the configuration of the present embodiment is not equal to the first embodiment in motor efficiency, functions, and the like, and the motor efficiency may be higher or the other functions may be superior.

Sixth Embodiment

A motor according to a sixth embodiment being an example of the present invention will be described. The motor according to the sixth embodiment is different from the motor 1 according to the first embodiment in a configuration of a coil. In detail, the present embodiment is different from the first embodiment in a manner of winding of a coil.

In this way, a manner of winding of a coil is slightly different, but the other configurations are similar to the configurations in the fifth embodiment. Thus, for an overall configuration of the motor according to the present embodiment, FIGS. 15 and 16 representing the motor according to the fifth embodiment are used for reference. Note that the same reference numerals are used as the reference numerals in the fifth embodiment.

In the present embodiment, focusing on each of a plurality of slots (teeth), two coils 3 are wound around the slot (tooth), and winding directions of the two wound coils 3 are opposite to each other. Further, the number of winding times of one coil of the two wound coils 3 is different from the number of winding times of the other coil. Specifically, the other coil is wound on the one coil, and the number of winding times of the other coil is greater than the number of winding times of the one coil (FIGS. 17 and 18).

Figure 17:
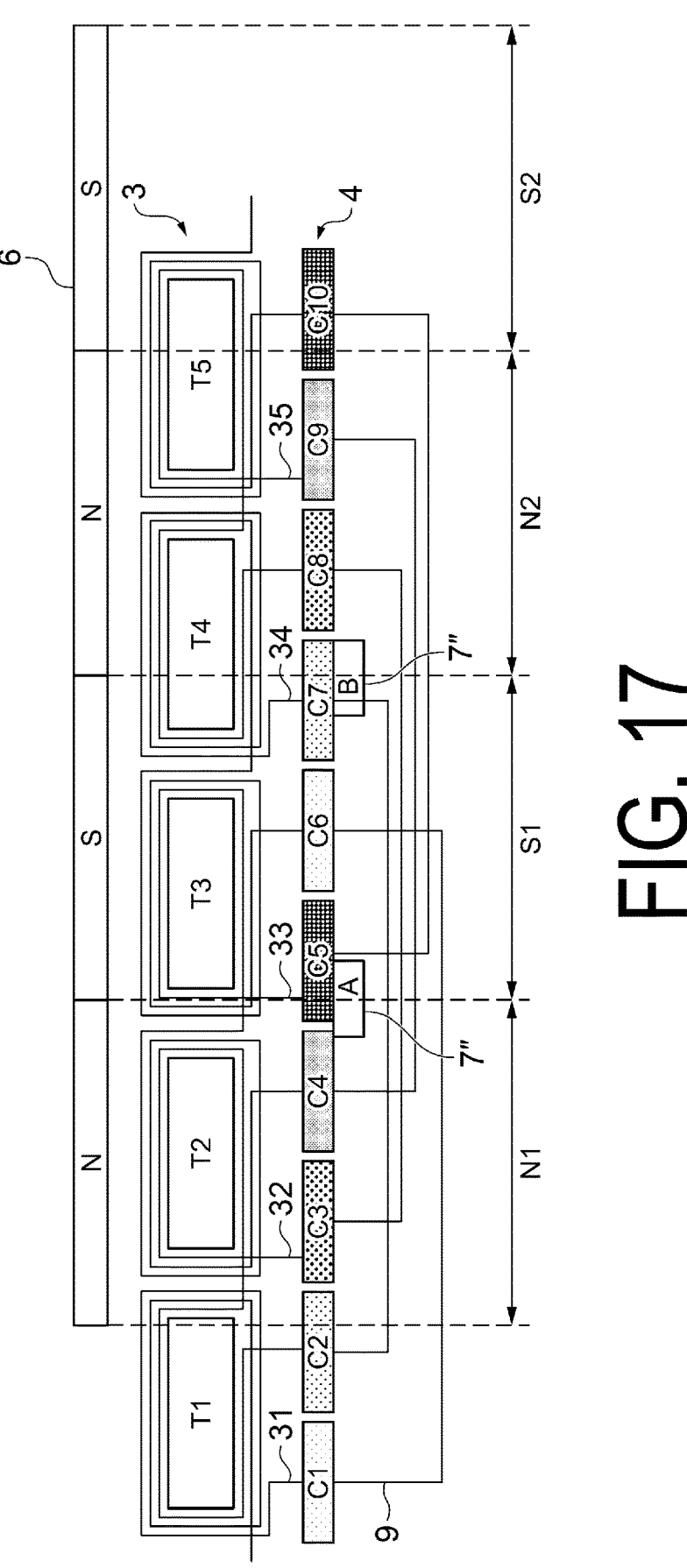
FIG. 17 is a schematic view developing, in the left-right direction, components of an armature arranged in the circumferential direction in a motor according to a sixth embodiment being an example of the present invention, and illustrating a mutual relationship (a positional relationship and a connection relationship).
Figure 18:
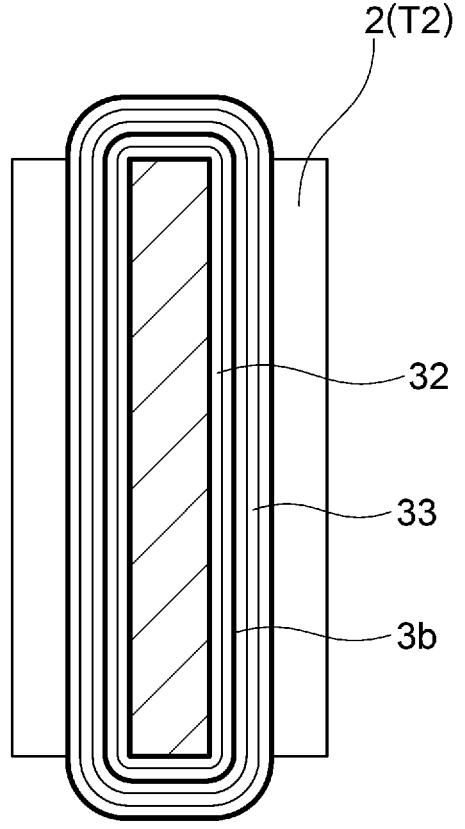
FIG. 18 is a schematic cross-sectional view illustrating two coils wound around a second tooth of the motor according to the sixth embodiment in a plane perpendicular to an extending direction (radial direction) of the second tooth.

Note that, in FIG. 17, the number of winding times of a coil 33 being the other coil around a second tooth T2 is two, and the number of winding times of a coil 32 being the one coil around the second tooth T2 is one. However, this schematically illustrates that the number of winding times of the coil 32 being the one coil is different from the number of winding times of the coil 33 being the other coil in the second tooth T2, and does not reflect an actual number of winding times. For example, in the second tooth T2, the number of winding times of the coil 33 being the other coil may be 27, and the number of winding times of the coil 32 being the one coil may be 25, or the number of winding times may be another number.

As the slot, the second tooth T2 is described above as a representative, but a state of a wound coil, a segment connected with the coil, and a relationship with slots at one side and the other side are all similar also in the other slots (a first tooth T1 and a third tooth T3 to a fifth tooth T5).

In the motor according to the present embodiment, two coils are wound around each of the plurality of slots (teeth), and the number of winding times of one coil of the two wound coils is different from the number of winding times of the other coil. Furthermore, the other coil is wound on the one coil, and the number of winding times of the other coil is greater than the number of winding times of the one coil.

Thus, it is possible to suppress variations in inductance between segments of the commutator or variations in resistance value. The variations may occur due to a specific configuration for setting a winding direction of a coil around one slot (tooth) of two slots wound around with the coil with the coil extending over the two slots to be opposite to a winding direction of the coil around the other slot (tooth).

As described above, the motor of the present invention is described with reference to the preferred embodiments, but the motor of the present invention is not limited to the configurations of the embodiments described above. For example, the number of magnetic poles of the magnet, the number of slots of the armature, and the number of segments of the commutator in the embodiments described above are exemplary and can be selected as appropriate on condition that a condition of the present invention is followed.

Further, in the embodiments described above, the magnet 6 has two different magnetic poles (N pole and S pole) alternately magnetized in the circumferential direction, and has a cylindrical shape. However, the present invention is not limited to this magnet 6. For example, in the magnet 6 in FIG. 1, a plurality of magnetic members separated by a broken line portion indicating a boundary line between the S pole and the N pole may be attached to the inner surface of the housing 5 such that the S pole and the N pole are alternately arranged in the circumferential direction.

In addition, the motor according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Motor
2 Rotor core

US 12,573,902 B2

23

3 Coil
4 Commutator
5 Housing
6 Magnet
7, 7', 7" Brush
8 Shaft
9 Connection wiring line
10 Armature
20 Stator
31 to 39 First coil to ninth coil
C1 to C18 Segment
T1 to T9 Tooth (slot)

The invention claimed is:

1. A motor comprising:
a magnet;
a plurality of teeth opposing the magnet;
a plurality of coils;
a commutator including a plurality of segments, wherein the number of the plurality of segments is twice the number of the plurality of teeth; and
a plurality of brushes, each of the plurality of brushes including a contact portion in contact with one or more of the plurality of segments in a circumferential direction, wherein the number of the plurality of brushes is two,
wherein for each coil of the plurality of coils:
the coil extends over and is wound around two teeth of the plurality of teeth,
a winding direction of the coil around one tooth of the two teeth is opposite to a winding direction of the coil around the other tooth of the two teeth, such that when a current is applied to the coil, the current flows clockwise around the one tooth and counterclockwise around the other tooth, and
in the circumferential direction, the coil wound around the one tooth is connected to one segment of two adjacent segments of the plurality of segments, and the coil wound around the other tooth is connected to the other segment of the two adjacent segments.

2. The motor according to claim 1, wherein for each tooth of the plurality of teeth:
two of the coils are wound around the tooth, and
winding directions of the two coils wound around the tooth are opposite to each other.

3. The motor according to claim 1, wherein for each coil, the two teeth wound around with the coil are adjacent to each other in the circumferential direction, the coil extending over the two teeth.

4. The motor according to claim 1, wherein one or two or more of the teeth different from the two teeth are located between the two teeth in the circumferential direction, the coil extending over the two teeth.

5. The motor according to claim 1, wherein in the circumferential direction, the one tooth and the one segment are located at one side, and the other tooth and the other segment are located at the other side.

6. The motor according to claim 1, wherein, when a width of the contact portion of the brush in contact with the commutator in a circumferential direction of the commutator is x, a width of the segment in the circumferential direction of the commutator is y, and a gap between the two adjacent segments in the circumferential direction of the commutator is z, a relational expression (1) below is satisfied:

$$x < y + 2z \qquad \text{Relational expression (1).}$$

7. The motor according to claim 1, wherein
two different magnetic poles in the magnet are alternately arranged in the circumferential direction,
a contact surface of the commutator in contact with the contact portion of the brush includes regions corresponding to the two different magnetic poles in the circumferential direction, and
the contact portion of the brush is in contact with the commutator across two of the regions, the regions corresponding to the two different magnetic poles.

8. The motor according to claim 1, wherein
the magnet is formed of a plurality of magnetic members, and
the plurality of magnetic members are arranged in the circumferential direction.

9. The motor according to claim 1, wherein a width of each of the plurality of segments is same in the circumferential direction.

10. The motor according to claim 1, wherein for each tooth of the plurality of teeth:
two of the coils are wound around the tooth, and
the number of winding times of one coil of the two coils is different from the number of winding times of the other coil of the two coils.

11. The motor according to claim 10, wherein
the other coil is wound on the one coil, and
the number of winding times of the other coil is greater than the number of winding times of the one coil.

* * * * *